US012379567B2

(12) United States Patent
Hirao et al.

(10) Patent No.: US 12,379,567 B2
(45) Date of Patent: Aug. 5, 2025

(54) LENS UNIT

(71) Applicant: SEIKOH GIKEN CO., LTD., Chiba (JP)

(72) Inventors: Tomomi Hirao, Chiba (JP); Ryosuke Niwaki, Chiba (JP)

(73) Assignee: SEIKOH GIKEN CO., LTD., Chiba (JP)

( * ) Notice: Subject to any disclaimer, the term of this patent is extended or adjusted under 35 U.S.C. 154(b) by 637 days.

(21) Appl. No.: 17/784,261

(22) PCT Filed: Dec. 24, 2020

(86) PCT No.: PCT/JP2020/048362
§ 371 (c)(1),
(2) Date: Jun. 10, 2022

(87) PCT Pub. No.: WO2021/132433
PCT Pub. Date: Jul. 1, 2021

(65) Prior Publication Data
US 2023/0043603 A1    Feb. 9, 2023

(30) Foreign Application Priority Data
Dec. 25, 2019   (JP) ................................ 2019-234027

(51) Int. Cl.
*G02B 7/02*     (2021.01)
*G02B 23/24*    (2006.01)
*H04N 23/54*    (2023.01)

(52) U.S. Cl.
CPC ............. *G02B 7/025* (2013.01); *G02B 7/021* (2013.01); *G02B 23/243* (2013.01); *H04N 23/54* (2023.01)

(58) Field of Classification Search
CPC .......... G02B 7/02; G02B 7/021; G02B 7/022; G02B 7/023; G02B 7/025; G02B 23/243;
(Continued)

(56) References Cited

U.S. PATENT DOCUMENTS 5,748,385 A * 5/1998 Miyano ............... G02B 23/243
359/691
2002/0186478 A1   12/2002 Watanabe et al.
(Continued)

FOREIGN PATENT DOCUMENTS

CN       1517736 A    8/2004
CN    205484987 U   8/2016
(Continued)

OTHER PUBLICATIONS

International Search Report for International Application No. PCT/JP2020/048362 dated Mar. 23, 2021, Japan, 3 pages.

*Primary Examiner* — Ephrem Z Mebrahtu
(74) *Attorney, Agent, or Firm* — United IP Counselors, LLC

(57) ABSTRACT

A lens unit includes: a lens including a lens part formed at the center of the lens, and a flange part that extends radially outward from the periphery of the lens part and includes a rear end surface on its rear side; a transparent spacer that is disposed behind the lens in the optical axis direction and used for focusing the lens part, the spacer including a front end surface that opposes to the rear of the lens, a spaced-apart part that opposes to the lens part and is spaced apart rearward in the optical axis direction from the lens part, and a bonded peripheral part that extends radially outward from the periphery of the spaced-apart part; and an adhesive that is disposed between the rear end surface of the flange part and the bonded peripheral part and bonds the lens and the spacer.

17 Claims, 16 Drawing Sheets

(58) Field of Classification Search
CPC ........ G02B 23/24; G02B 7/026; G02B 23/24;
G02B 23/2407; G02B 23/2415; G02B
23/2423; G02B 23/2438; G02B 23/2446;
G02B 23/2453; G02B 23/2461; G02B
23/2469; G02B 23/2476; G02B 23/2484;
G02B 23/2492; G02B 23/26; H04N
23/55; H04N 23/54
See application file for complete search history.

(56) References Cited

U.S. PATENT DOCUMENTS

| | | |
|---|---|---|
| 2004/0212719 A1 | 10/2004 | Ikeda |
| 2005/0030647 A1 | 2/2005 | Amanai |
| 2011/0298075 A1 | 12/2011 | Teramoto |
| 2014/0009592 A1* | 1/2014 | Ishida .................... H04N 7/183 348/76 |
| 2017/0047362 A1* | 2/2017 | Alasirniö .............. H10F 77/407 |
| 2018/0303325 A1* | 10/2018 | Fujimori ............ A61B 1/00096 |
| 2019/0090720 A1 | 3/2019 | Maeda |
| 2021/0344822 A1* | 11/2021 | Yoneyama ............ H10F 39/024 |

FOREIGN PATENT DOCUMENTS

| | | | |
|---|---|---|---|
| CN | 206339736 | U | 7/2017 |
| CN | 209122163 | U | 7/2019 |
| DE | 10225378 | A1 | 6/2003 |
| EP | 1443754 | A2 | 8/2004 |
| JP | 2002-365560 | A | 12/2002 |
| JP | 2004-029554 | A | 1/2004 |
| JP | 2004-226872 | A | 8/2004 |
| JP | 2005-062315 | A | 3/2005 |
| JP | 2005-157253 | A | 6/2005 |
| JP | 2006162792 | A * | 6/2006 |
| JP | 5464502 | B2 | 4/2014 |
| JP | 2015-127741 | A | 7/2015 |
| JP | 2018-072795 | A | 5/2018 |
| JP | 2019-045652 | A | 3/2019 |
| KR | 10-2004-0068865 | A | 8/2004 |
| KR | 10-2014-0023551 | A | 2/2014 |
| TW | 200421863 | A | 10/2004 |
| WO | 2017/212520 | A1 | 12/2017 |
| WO | 2019/044538 | A1 | 3/2019 |

* cited by examiner

Prior Art

LENS UNIT

CROSS-REFERENCE TO RELATED APPLICATIONS

This application is a National Stage Entry application of PCT International Application No. PCT/JP2020/048362, filed on Dec. 24, 2020, which claims the priority benefit of Japanese Patent Application No. 2019-234027, filed on Dec. 25, 2019, the entire contents of both of which are hereby incorporated by reference.

BACKGROUND

1. Technical Field

The present invention relates to a small lens unit that is coupled to any of various sensor modules.

2. Description of the Background

Various types of medical endoscopes such as a brain scope, an otolaryngological scope, a thoracoscope (a thoracoscope), a laparoscope (a laparoscope) and others are used for diagnosis and treatment. In addition to medical endoscopes, industrial endoscopes are used for various inspections. Such an endoscope includes a sensor module (a scope) that has a small lens unit set at its tip. For example, as shown in FIG. 16, the small lens unit includes a cover glass 14, an aperture-setting means 12, a lens 11, and a sensor-dedicated cover member 15 aligned in the optical axis direction. In a small lens unit 10H shown in FIG. 16, a flange part 32 of a lens 11 directly abuts on a sensor-dedicated cover member 15 for focusing. An adhesive 29 bonds an abutment surface 26 (a rear end surface) of the flange part 32 that is abutting on and a front end surface 41 of the sensor-dedicated cover member 15.

There has been disclosed an invention relating to a lens unit: a lens unit that includes a plurality of layered wafer lenses each including a glass substrate and a molded resin part on the glass substrate, the molded part partially including a lens part (for example, JP 5464502 B). The lens unit includes a package member. The package member externally covers the lens unit, and includes an opening for allowing light to enter the lens part. A molded resin part around a first lens part on the most object side forms a projection part that projects toward the object side. The projection part includes a slope part in which a side surface opposite to the first lens part has its diameter increased toward the image side. The opening of the package member includes a slope opening that fits with the slope part.

BRIEF SUMMARY

As shown in FIG. 16, in the small lens unit 10H in which the flange part 32 and the sensor-dedicated cover member 15 abut on each other, the flange part 32 is set back so as not to interfere with the optical path. This increases the length in the optical axis direction of the flange part 32 and reduces the area of the abutment surface 26 (the rear end surface) of the flange part 32. This consequently makes it difficult to stably fix the abutment surface 26 of the flange part 32 and the front end surface 41 of the sensor-dedicated cover member 15.

When the abutment surface 26 (the rear end surface) and the front end surface 41 are bonded by an adhesive, the adhesive being reduced in amount reduces the bonding area and impairs the fixing strength. As a result, when a prescribed load acts on the flange part 32, the abutment surface 26 of the flange part 32 and the surrounding region are easily damaged or broken. Furthermore, the long back focus of the lens 11 inevitably increases the extending dimension of the flange part 32 rearward in the optical axis direction. This extremely reduces the area of the abutment surface 26 (the rear end surface), making it more difficult to stably fix the abutment surface 26 and the front end surface 41.

An object of the present invention is to provide a lens unit that includes a lens having its flange part stably fixed and being easily focused.

A lens unit of the present invention includes:
a lens including
  a lens part that is formed at a center of the lens, and
  a flange part that extends radially outward from a periphery of the lens part, the flange part including a rear end surface on its rear side;
a transparent spacer that is disposed behind the lens in an optical axis direction and used for focusing the lens part, the spacer including
  a front end surface that opposes to a rear of the lens,
  a spaced-apart part that opposes to the lens part and is spaced apart rearward in the optical axis direction from the lens part, and
  a bonded peripheral part that extends radially outward from a periphery of the spaced-apart part; and
an adhesive that is disposed between the rear end surface of the flange part and the bonded peripheral part and bonds the lens and the spacer.

The lens unit of the present invention includes a lens having its flange part stably fixed and being easily focused.

DETAILED DESCRIPTION

First Embodiment

Figure 1:
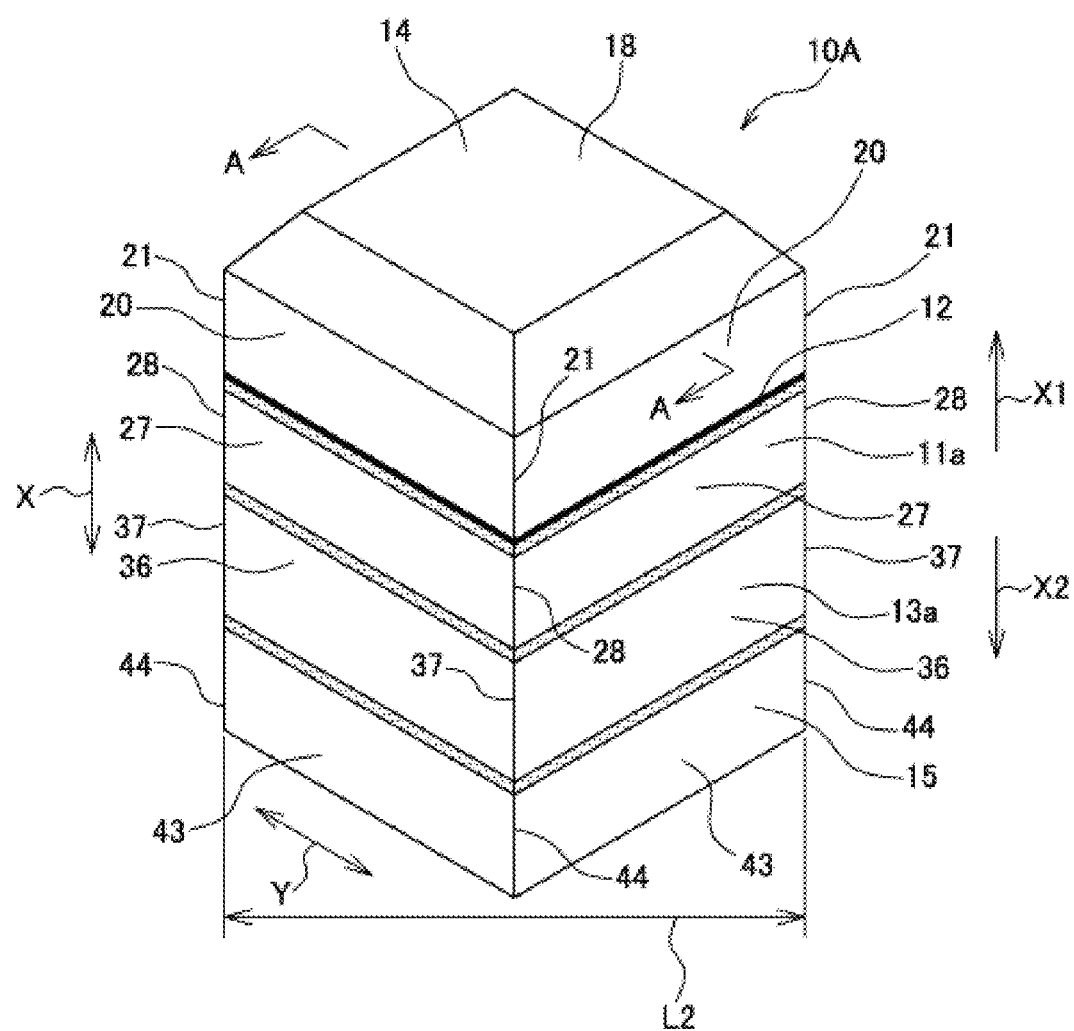
FIG. 1 is a perspective view of a small lens unit.
Figure 2:
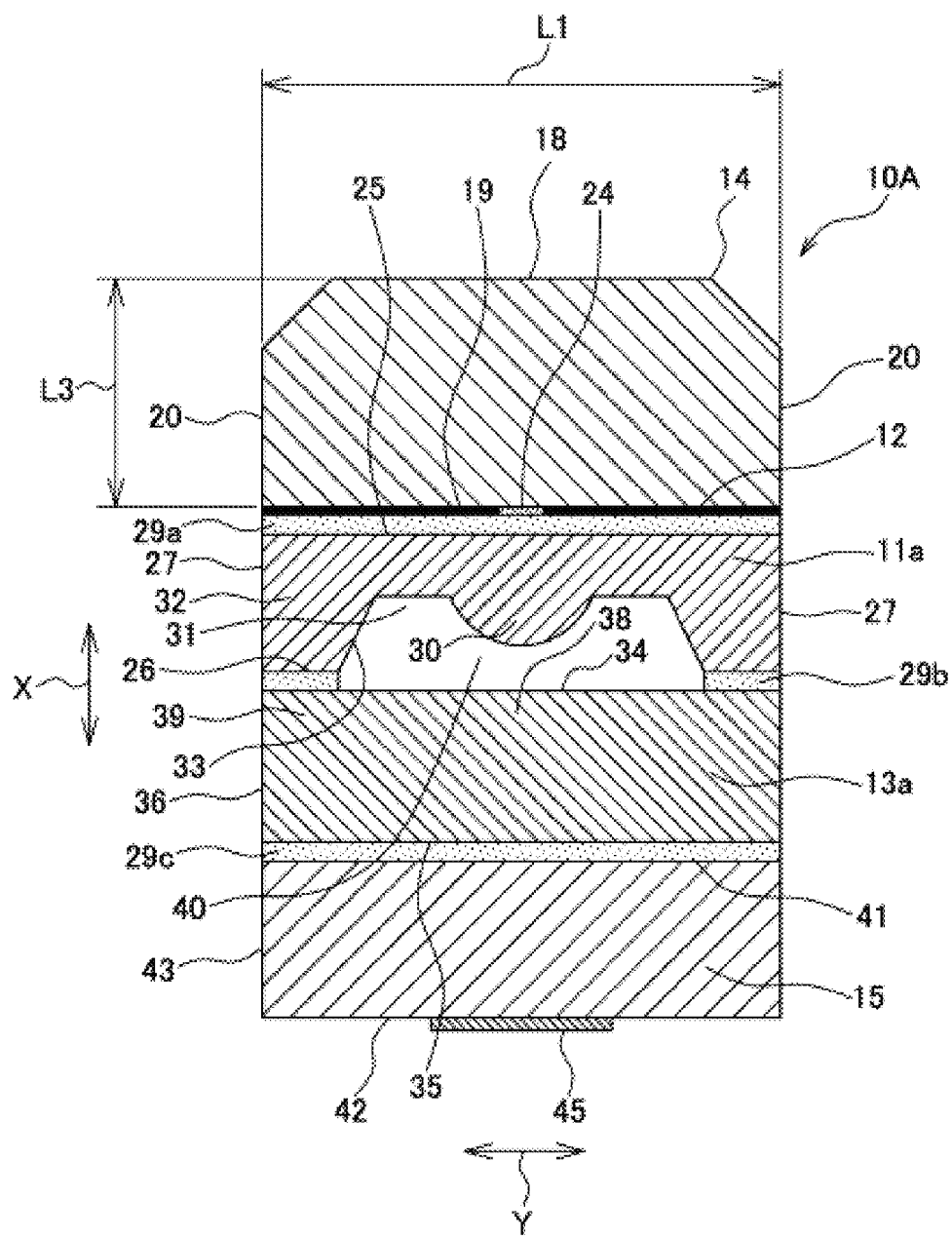
FIG. 2 is a cross-sectional view of the small lens unit according to a first embodiment taken along line A-A in FIG. 1.
Figure 3:
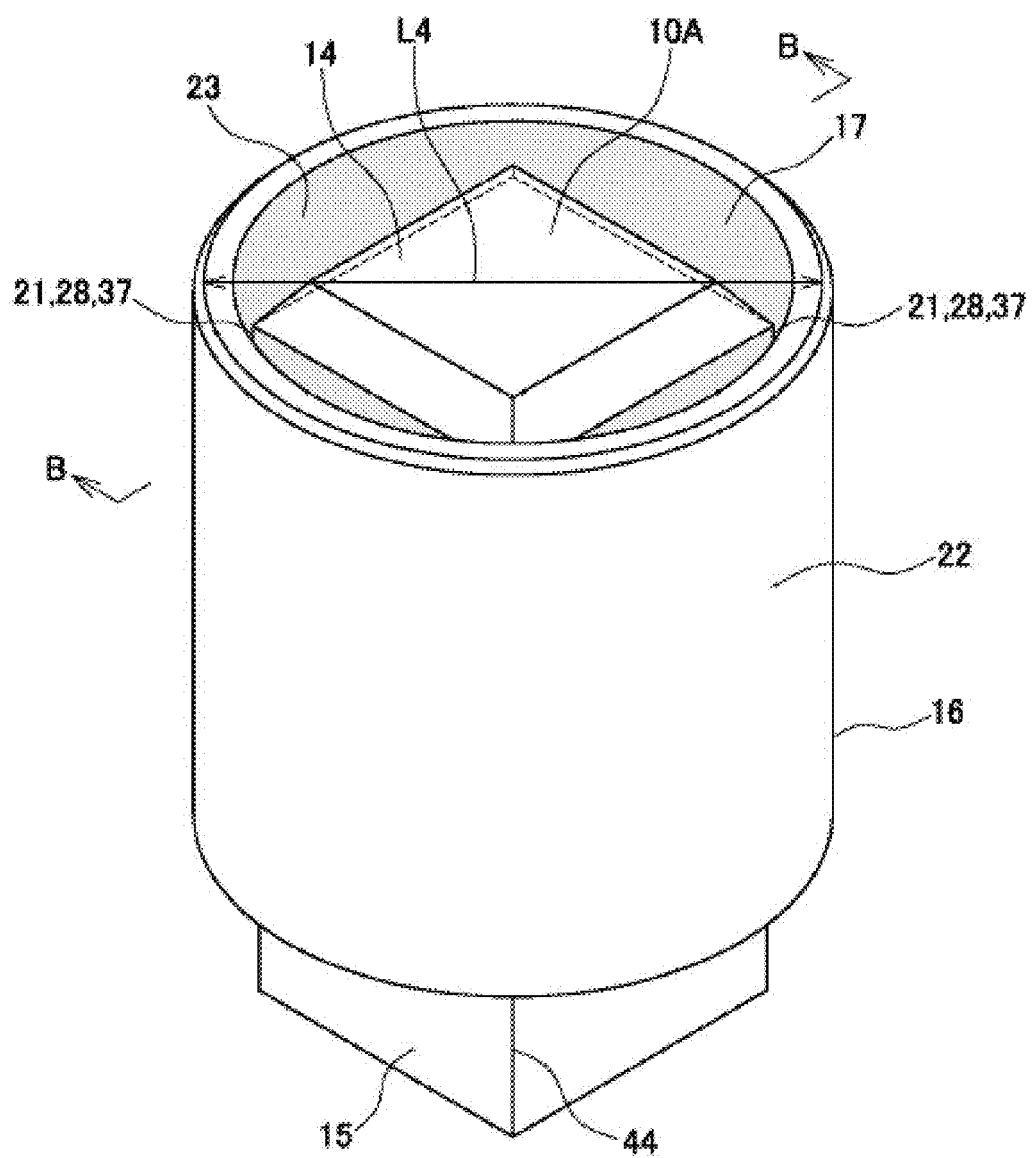
FIG. 3 is a perspective view of a holder housing the small lens unit in FIG. 1.
Figure 4:
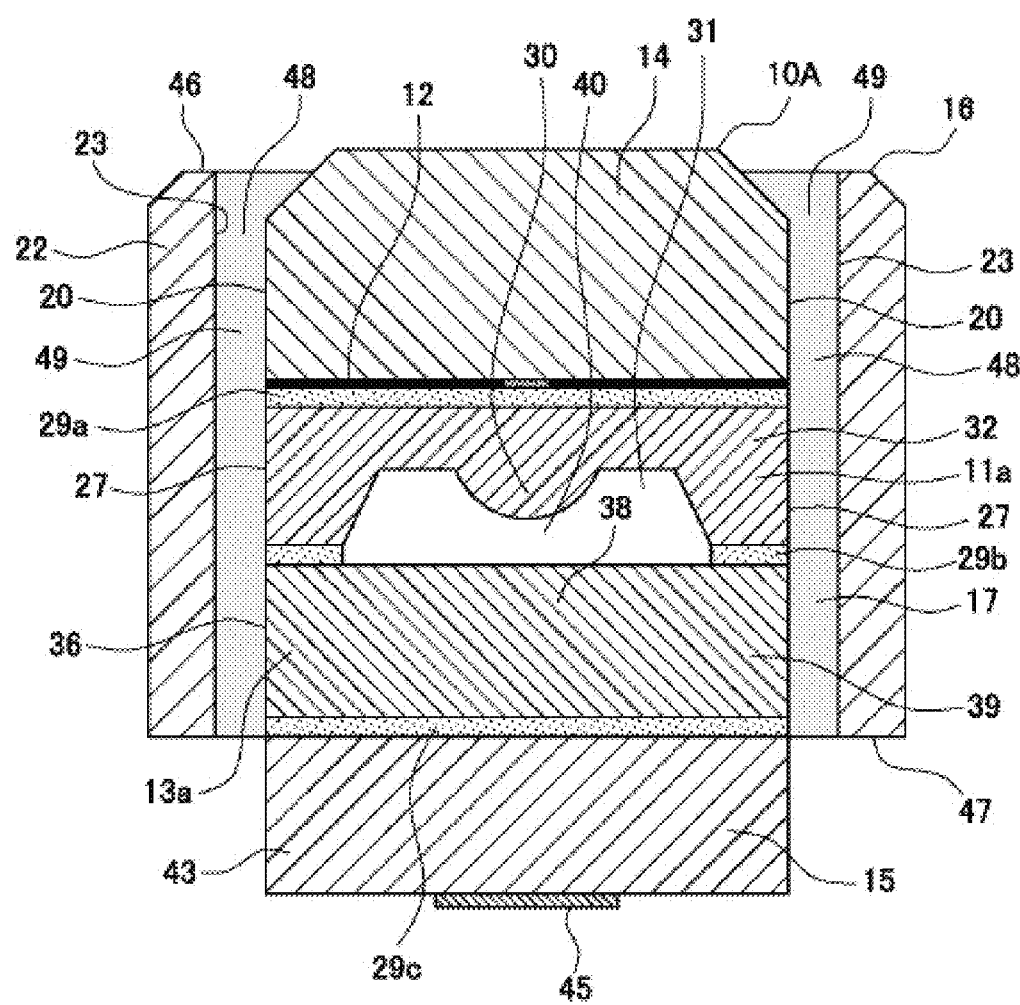
FIG. 4 is a cross-sectional view taken along line B-B in FIG. 3.

In the following, a detailed description will be given of a small lens unit according to a first embodiment. FIG. 1 is a perspective view of a small lens unit 10A. FIG. 2 is a cross-sectional view of the first embodiment taken along line A-A in FIG. 1. FIG. 3 is a perspective view of a holder 16 housing the small lens unit 10A in FIG. 1. FIG. 4 is a cross-sectional view taken along line B-B in FIG. 3. In FIGS. 1 and 2, arrow X indicates the optical axis direction, arrow Y indicates the radial direction, arrow X1 indicates the front side in the optical axis direction, and arrow X2 indicates the rear side in the optical axis direction.

The small lens unit 10A (similarly referred to in other embodiments) is suitably used as a small-size lens unit set in any of various sensor modules. For example, the small lens unit 10A is set at the tip of the sensor module (the scope) of an endoscope (not shown). The endoscope includes various industrial endoscopes, various medical endoscopes such as an angioscope, a brain scope, and an otolaryngological scope, and any other endoscopes that will be developed in the future.

The lens unit 10A includes a lens 11a, an aperture pattern 12 (aperture-setting means), and a spacer 13a. In the lens unit 10A, a cover member 14 and a sensor-dedicated cover member 15 are disposed. The cover member 14 is disposed at the front of the lens 11a in the optical axis direction. The sensor-dedicated cover member 15 is disposed behind the spacer 13a in the optical axis direction. The cover member 14, the aperture pattern 12, the lens 11a, the spacer 13a, and the sensor-dedicated cover member 15 are aligned in series in the optical axis direction. As shown in FIG. 3, the cover member 14, the aperture pattern 12, the lens 11a, the spacer 13a, and the sensor-dedicated cover member 15 are housed in housing space 17 of a holder 16.

The cover member 14, the aperture pattern 12, the lens 11a, the spacer 13a, and the sensor-dedicated cover member 15 are integrated. Note that, the lens unit 10A may include the cover member 14, the aperture pattern 12, the lens 11a (including lenses 11b to 11g), the spacer 13a (including spacers 13b to 13f), and the sensor-dedicated cover member 15. Alternatively, the lens unit 10A may include the cover member 14, the aperture pattern 12, the lens 11a (including the lenses 11b to 11g), the spacer 13a (including the spacers 13b to 13f), the sensor-dedicated cover member 15, and the holder 16.

Alternatively, the lens unit 10A may include the cover member 14, the aperture pattern 12, the lens 11a (including the lenses 11b to 11g), and the spacer 13a (including the spacers 13b to 13f). Alternatively, the lens unit 10A may include the aperture pattern 12, the lens 11a (including the lenses 11b to 11g), the spacer 13a (including the spacers 13b to 13f), and the sensor-dedicated cover member 15. Alternatively, the lens unit 10A may include the aperture pattern 12, the lens 11a (including the lenses 11b to 11g), the spacer 13a (including the spacers 13b to 13f), the sensor-dedicated cover member 15, and the holder 16.

The cover member 14 is formed of transparent glass (cover glass) or transparent synthetic resin. The cover member 14 includes a front end surface 18, a rear end surface 19, four side surfaces 20, and four corners 21. The front end surface 18 is a flat surface on the object side (indicated by arrow X1). The rear end surface 19 is a flat surface on an image side (indicated by arrow X2) on the side (the lens 11a side) opposite to the front end surface 18. The four side surfaces 20 extend between the front end surface 18 and the rear end surface 19. The corners 21 are each located where the side surfaces 20 intersect.

The shape of the side surfaces 20 continuous from the front end surface 18 to the rear end surface 19 is a square prism (a quadrangular prism). The radial cross-sectional shape of the cover member 14 is a square (a quadrangle). The corners where the front end surface 18 and the side surfaces 20 (circumferential surfaces) intersect are removed, that is, chamfered. Note that, the front end surface 18 and the side surfaces 20 may not be chamfered by such corners.

As shown in FIGS. 3 and 4, the cover member 14 is fitted into the front part of the housing space 17 of the holder 16 to be positioned at the front of the aperture pattern 12 in the optical axis direction. The four corners 21 abut on an inner circumferential surface 23 of a barrel 22 of the holder 16. The barrel 22 of the holder 16 forms a circumcircle of the square cross-sectional shape of the cover member 14. Note that, at least two of the four corners 21 abutting on the inner circumferential surface 23 of the barrel 22 of the holder 16 will suffice.

Note that, the shape of the side surfaces 20 may be, in place of a quadrangular prism, any polygonal prism (such as a triangular prism, a pentagonal prism, and a hexagonal prism) or a circular cylinder. The radial cross-sectional shape of the cover member 14 may be, in place of a quadrangle, any polygon (such as a triangle, a pentagon, a hexagon) or a circle.

The cover member 14 (including cover members 14b, 14c) has, for example, a diameter L1 of 1.1 mm, a maximum radial diameter (the length of a diagonal) L2 of 1.2 mm, and a thickness dimension L3 of 0.3 mm. The diameter L1, the maximum radial diameter L2, and the thickness dimension L3 of the cover member 14 are determined as appropriate by the type of the sensor module to which the small lens unit 10A is coupled, and the diameter L1, the maximum radial diameter L2, and the thickness dimension L3 of the cover member 14 are not particularly specified.

The aperture pattern 12 is formed on the rear end surface 19 of the cover member 14. The aperture pattern 12 is a chromium film of any light-cutting color (for example, black or gray) for masking formed on the rear end surface 19 by photo etching or the like. The aperture pattern 12 is identical to the cover member 14 in the cross-sectional shape. The radial cross-sectional shape of the aperture pattern 12 is, for example, a square (a quadrangle). The aperture pattern 12 is positioned behind the cover member 14 in the optical axis direction.

The aperture pattern 12 has a circular hole 24 at its center. The aperture pattern 12 may be an aperture pattern 12 (a chromium film) for masking formed on each of the front end surface 18 and the rear end surface 19 by photo etching. Alternatively, the aperture pattern 12 may be an aperture pattern 12 (a chromium film) for masking formed on the front end surface 18 by photo etching.

The aperture pattern 12 can be formed by photo etching on the rear end surface 19 (alternatively, both of the front end surface 18 and the rear end surface 19, or the front end surface 18) of the cover member 14. This eliminates the necessity of, for example, disposing a copper diaphragm (aperture-setting means) between the lens 11a and the cover member 14. That is, the present embodiment can dispense with a copper diaphragm and save time and labor to interpose the copper diaphragm between the lens 11a and the cover member 14.

The lens 11a is formed of transparent glass or transparent synthetic resin. The lens 11a includes the front end surface 25, the rear end surface 26, the four side surfaces 27, and the four corners 28. The front end surface 25 is a flat surface on the object side (the cover member 14 side). The rear end surface 26 is a surface on the image side (the spacer 13a side) opposite to the front end surface 25. The four side surfaces 27 extend between the front end surface 25 and the rear end surface 26. The corners 28 are each located where the side surfaces 27 intersect. The lens 11a is positioned behind the aperture pattern 12 in the optical axis direction. The front end surface 25 opposes to the rear end surface 19 (the aperture pattern 12) of the cover member 14. The front end surface 25 is bonded by a transparent adhesive 29a to the rear end surface 19 (the aperture pattern 12) of the cover member 14.

The adhesive 29a bonding the front end surface 25 of the lens 11a and the rear end surface 19 of the cover member 14 is different in refractive index from the transparent lens 11a and the transparent cover member 14 by 0.1 or less. Specifically, the adhesive 29a is different in refractive index from the cover member 14 by 0.1 or less; and the adhesive 29a is different in refractive index from the lens 11a by 0.1 or less.

When the transparent adhesive 29a is different in refractive index from the transparent lens 11a as well as the transparent cover member 14 by more than 0.1, light may be refracted by the adhesive 29a, and the small lens unit 10A may fail to form an accurate image. Here, setting the refractive index difference between the adhesive 29a and the transparent lens 11a as well as the transparent cover member 14 of 0.1 or less, any refraction of an image attributed to the adhesive 29a that bonds the lens 11a and the cover member 14 is avoided. Furthermore, this suppresses any reflection at the interface between the adhesive 29a and other members and prevents unwanted light from entering the sensor module (the sensor). Furthermore, the small lens unit 10A surely forms an accurate image while avoiding flare and ghost.

The lens 11a is identical in cross-sectional shape to the cover member 14. The radial cross-sectional shape of the lens 11a is a square (a quadrangle). The radial cross-sectional shape of the lens 11a may be, in place of a quadrangle, any polygon (such as a triangle, a pentagonal prism, and a hexagonal prism) or a circle.

The lens 11a has, for example, a diameter L1 of 1.1 mm and a maximum radial diameter (the length of a diagonal) L2 of 1.2 mm. The diameter L1 and the maximum radial diameter L2 of the lens 11a are determined as appropriate by the type of the sensor module to which the small lens unit 10A is coupled, and the diameter L1 and the maximum radial diameter L2 are not particularly specified.

As shown in FIG. 4, the lens 11a is fitted into the middle part of the housing space 17 of the holder 16 to be positioned at the front of the spacer 13a in the optical axis direction. The four corners 28 of the lens 11a abut on the inner circumferential surface 23 of the barrel 22 of the holder 16. The barrel 22 of the holder 16 forms a circumcircle of the square cross-sectional shape of the lens 11a. Note that, at least two of the four corners 28 abutting on the inner circumferential surface 23 of the barrel 22 of the holder 16 will suffice.

The lens 11a includes a convex lens part 30 (a lens part), an annular concave part 31, and a flange part 32 of a predetermined area. The convex lens part 30 is circular and formed at the center of the lens 11a. The convex lens part 30 is convex rearward in the optical axis direction toward the spacer 13a. The convex lens part 30 is a spherical lens, but it may be an aspheric lens. The concave part 31 is concave frontward in the optical axis direction from the convex lens part 30 and the flange part 32. The concave part 31 is positioned between the convex lens part 30 and the flange part 32, and extends flatly radially outward from the periphery of the convex lens part 30 and surrounds the periphery of the convex lens part 30.

The flange part 32 extends radially outward from the outer periphery of the concave part 31 and surrounds the outer periphery of the concave part 31. The flange part 32 includes an inner side surface 33 and a rear end surface 26. The inner side surface 33 extends rearward in the optical axis direction from the outer periphery of the concave part 31 while increasing its width. The rear end surface 26 is a flat surface that extends radially outward from the tip of the inner side surface 33. The rear end surface 26 is spaced apart rearward in the optical axis direction from the center of the convex lens part 30, and is positioned just slightly rearward in the optical axis direction from the center of the convex lens part 30.

The spacer 13a is formed of transparent glass or transparent synthetic resin. The spacer 13a includes a front end surface 34, a rear end surface 35, a four side surfaces 36, and four corners 37. The front end surface 34 is a flat surface on the object side (the lens 11a side). The rear end surface 35 is a flat surface on an image side (the sensor-dedicated cover member 15 side) opposite to the front end surface 34. The four side surfaces 36 extend between the front end surface 34 and the rear end surface 35. The corners 37 are each located where the side surfaces 36 intersect. The shape of the side surfaces 36 is a square prism (a quadrangular prism). The radial cross-sectional shape of the spacer 13a is a square (a quadrangle). The spacer 13a is identical in cross-sectional shape to the cover member 14 and the lens 11a.

The spacer 13a is disposed behind the lens 11a in the optical axis direction and interposed between the lens 11a and the sensor-dedicated cover member 15. The spacer 13a has its length in the optical axis direction adjusted, and used for focusing the lens 11a. As shown in FIG. 4, the spacer 13a is fitted into the lower part of the housing space 17 of the holder 16 to be positioned at the front of the sensor-dedicated cover member 15 in the optical axis direction. The four corners 37 abut on the inner circumferential surface 23 of the barrel 22 of the holder 16. The barrel 22 of the holder 16 forms a circumcircle of the square cross-sectional shape of the spacer 13a. Note that, at least two of the four corners 37 abutting on the inner circumferential surface 23 of the barrel 22 of the holder 16 will suffice.

The spacer 13a includes a circular spaced-apart part 38 and a bonded peripheral part 39. The spaced-apart part 38 opposes to the convex lens part 30 and the concave part 31 of the lens 11a. The bonded peripheral part 39 has a predetermined area and opposes to the flange part 32 of the lens 11a. In the spaced-apart part 38, the front end surface 34 is spaced apart by a predetermined dimension rearward in the optical axis direction from the convex lens part 30 and the concave part 31 of the lens 11a. The bonded peripheral part 39 extends radially outward from the outer periphery of the spaced-apart part 38 and surrounds the spaced-apart part 38.

The front end surface 34 of the bonded peripheral part 39 is flush with the front end surface 34 of the spaced-apart part 38 and extends radially outward from the periphery of the spaced-apart part 38. The front end surface 34 of the bonded peripheral part 39 abuts on the rear end surface 26 of the flange part 32. The front end surface 34 is bonded by a transparent adhesive 29b to substantially the entire area of the rear end surface 26 of the flange part 32. Space 40 is formed between the convex lens part 30 and the concave part 31 of the lens 11a and the front end surface 34 of the spaced-apart part 38 of the spacer 13a. Note that, the rear end surface 35 of the spacer 13a may be provided with concave-convex parts 50 as in FIG. 5, or a concave part 53 as in FIG. 9 or a convex part.

The shape of the side surfaces 36 may be, in place of a quadrangular prism, any polygonal prism (such as a triangular prism, a pentagonal prism, and a hexagonal prism) or a circular cylinder. The radial cross-sectional shape of the spacer 13a may be, in place of a quadrangle, any polygon (such as a triangle, a pentagon, a hexagon) or a circle. The spacer 13a has, for example, a diameter L1 of 1.1 mm, and a maximum radial diameter (the length of a diagonal) L2 of 1.2 mm. The diameter L1 and the maximum radial diameter L2 of the spacer 13a are determined as appropriate by the type of the sensor module to which the small lens unit 10A is coupled, and the diameter L1 and the maximum radial diameter L2 are not particularly specified.

The sensor-dedicated cover member 15 is formed of transparent glass (sensor-dedicated cover glass) or transparent synthetic resin. The sensor-dedicated cover member 15 is positioned behind the spacer 13a in the optical axis direction. The sensor-dedicated cover member 15 includes a front end surface 41, a rear end surface 42, four side surfaces 43, and four corners 44. The front end surface 41 is a flat surface on the object side (the spacer 13a side). The rear end surface 42 is a flat surface on the image side opposite to the front end surface 41. The four side surfaces 43 extend between the front end surface 41 and the rear end surface 42. The corners 44 are located where the side surfaces 43 intersect. The shape of the side surfaces of the sensor-dedicated cover member 15 is a square prism (a quadrangular prism). The radial cross-sectional shape of the sensor-dedicated cover member 15 is a square (a quadrangle). The sensor-dedicated cover member 15 is identical in cross-sectional shape to the cover member 14, the lens 11a, and the spacer 13a.

As shown in FIG. 4, the sensor-dedicated cover member 15 is positioned behind the holder 16. The front end surface 41 opposes to the rear end surface 35 of the spacer 13a. The front end surface 41 is bonded by a transparent adhesive 29c to the rear end surface 35 of the spacer 13a. At the rear end surface 42 of the sensor-dedicated cover member 15, a light receiving element 45 is set.

Since the adhesive 29c bonds the rear end surface 35 of the spacer 13a to the front end surface 41 of the sensor-dedicated cover member 15, the front end surface 41 of the sensor-dedicated cover member 15 and the rear end surface 35 of the spacer 13a are stably fixed. In addition to this strong fixation by the adhesive 29c between the front end surface 41 of the sensor-dedicated cover member 15 and the rear end surface 35 of the spacer 13a, the rear end surface 35 of the spacer 13a and the front end surface 41 of the sensor-dedicated cover member 15 and the surrounding region are prevented from being damaged or broken even when a prescribed load acts on the spacer 13a and the sensor-dedicated cover member 15.

The adhesive 29c bonding the rear end surface 35 of the spacer 13a and the front end surface 41 of the sensor-dedicated cover member 15 is different in refractive index from the transparent spacer 13a and the transparent sensor-dedicated cover member 15 by 0.1 or less. Specifically, the adhesive 29c is different in refractive index from the spacer 13a by 0.1 or less; and the adhesive 29c is different in refractive index from the sensor-dedicated cover member 15 by 0.1 or less.

When the transparent adhesive 29c is different in refractive index from the transparent spacer 13a as well as the transparent sensor-dedicated cover member 15 by more than 0.1, light may be refracted by the adhesive 29c, and the small lens unit 10A may fail to form an accurate image. Here, setting the refractive index difference between the adhesive 29c and the transparent spacer 13a as well as the transparent sensor-dedicated cover member 15 of 0.1 or less, any refraction of an image attributed to the adhesive 29c that bonds the spacer 13a and the sensor-dedicated cover member 15 is avoided. Furthermore, this suppresses any reflection at the interface between the adhesive 29c and other members and prevents unwanted light from entering the sensor module (the sensor). Furthermore, the small lens unit 10A surely forms an accurate image while avoiding flare and ghost.

The shape of the side surfaces 43 may be, in place of a quadrangular prism, any polygonal prism (such as a triangular prism, a pentagonal prism, and a hexagonal prism) or a circular cylinder. The radial cross-sectional shape of the sensor-dedicated cover member 15 may be, in place of a quadrangle, any polygon (such as a triangle, a pentagon, a hexagon) or a circle.

The sensor-dedicated cover member 15 has, for example, a diameter L1 of 1.1 mm, and a maximum radial diameter (the length of a diagonal) L2 of 1.2 mm. The diameter L1 and the maximum radial diameter L2 of the sensor-dedicated cover member 15 are determined as appropriate by the type of the sensor module to which the small lens unit 10A is coupled, and the diameter L1 and the maximum radial diameter L2 are not particularly specified.

The holder 16 is formed of synthetic resin (plastic). The holder 16 includes the barrel 22 and the housing space 17. The barrel 22 has a shape of a cylinder elongated in the optical axis direction. The housing space 17 is surrounded by the barrel 22. The barrel 22 includes a front end 46 and a rear end 47. The diameter L4 of the barrel 22 (the outer diameter of the holder) is, for example, 1.4 mm. Note that, the holder 16 may be formed of metal such as SUS or alloy. The diameter L4 of the barrel 22 (the outer diameter of the holder) is determined as appropriate by the type of the sensor module to which the small lens unit 10A is coupled, and the diameter L4 of the barrel 22 is not particularly specified. Note that, the diameter L4 of the barrel 22 (the outer diameter of the holder) is adjusted within a range of 0.5 mm to 3 mm.

The radial cross-sectional shape of the housing space 17 is a circle (a perfect circle). The housing space 17 is cylindrical and extends from the front end 46 (front) to the rear end 47 (rear) of the barrel 22. The maximum inner diameter of the housing space 17 is adjusted within a range of 0.4 mm to 2 mm. This allows the small lens unit 10A to be housed in the housing space 17 of the holder 16, and implements extremely small holder 16 and lens unit 10A that are suitably coupled to a small sensor module.

The radial cross-sectional shape (a circle) of the barrel 22 is different from the radial cross-sectional shape (a square) of the cover member 14 and the small lens unit 10A (the aperture pattern 12, the lens 11*a*, the spacer 13*a*). Accordingly, there exists a gap 48 extending in the optical axis direction, between the inner circumferential surface 23 of the barrel 22 and the side surfaces 20, 27, 36 (the outer circumferential surfaces) of the cover member 14 and the small lens unit 10A.

An adhesive 49 (filler) fills up (is injected into) the gap 48 (the housing space 17). The adhesive 49 cures in the gap. When the gap 48 allows entry of light, unwanted light can slightly enter the light receiving element 45. Here, employing the adhesive 49 of black or gray color for example and filling the gap 48 with such a light-blocking adhesive 49, any light that would otherwise enter the gap 48 will be blocked. This prevents any unwanted light from entering the light receiving element 45. Furthermore, the adhesive 49 fixes the cover member 14 and the small lens unit 10A to the housing space 17 of the holder 16. Note that, the gap 48 (the housing space 17) may not be filled with the adhesive 49.

When the small lens unit 10A coupled to the cover member 14 and the sensor-dedicated cover member 15 is set at the tip of the sensor module (the scope) of an endoscope, light that transmits through the cover member 14 enters the lens 11*a* via the hole 24 of the aperture pattern 12. Then, the light passes through the lens 11*a*, the spacer 13*a*, and the sensor-dedicated cover member 15 and enters the light receiving element 45 of the sensor module. Thus, the light is displayed as an image or output as an optical signal.

In the small lens unit 10A, the rear end surface 26 of the flange part 32 is spaced apart rearward in the optical axis direction from the center of the convex lens part 30. The rear end surface 26 of the flange part 32 is positioned just slightly rearward in the optical axis direction from the center of the convex lens part 30. The lens 11*a* includes the concave part 31 that is positioned between the convex lens part 30 and the flange part 32 and is concave frontward in the optical axis direction from the convex lens part 30 and the flange part 32. Thus, the space 40 is formed between the convex lens part 30 and the front end surface 34 of the spaced-apart part 38 of the spacer 13*a*. This eliminates the necessity of increasing the extending dimension of the flange part 32 of the lens 11*a* rearward in the optical axis direction and implements the rear end surface 26 of the flange part 32 of a greater area. This increases the bonding area of the rear end surface 26 of the flange part 32 to the front end surface 34 of the bonded peripheral part 39 of the spacer 13*a*.

The rear end surface 26 of the flange part 32 of the lens 11*a* abuts on the front end surface 34 of the bonded peripheral part 39 that extends radially outward from the periphery of the spaced-apart part 38 of the spacer 13*a*. The adhesive 29*b* bonds the rear end surface 26 of the flange part 32 and the front end surface 34 of the bonded peripheral part 39 of the spacer 13*a*. Accordingly, the rear end surface 26 of the flange part 32 and the front end surface 34 of the bonded peripheral part 39 of the spacer 13*a* are stably fixed. Furthermore, the adhesive 29*b* strongly fixes the rear end surface 26 of the flange part 32 and the front end surface 34 of the bonded peripheral part 39. Even when a prescribed load acts on the flange part 32 of the lens 11*a* and the spacer 13*a*, the rear end surface 26 of the flange part 32, the front end surface 34 of the bonded peripheral part 39 of the spacer 13*a*, and the surrounding region are prevented from being damaged or broken.

Second Embodiment

Figure 5:
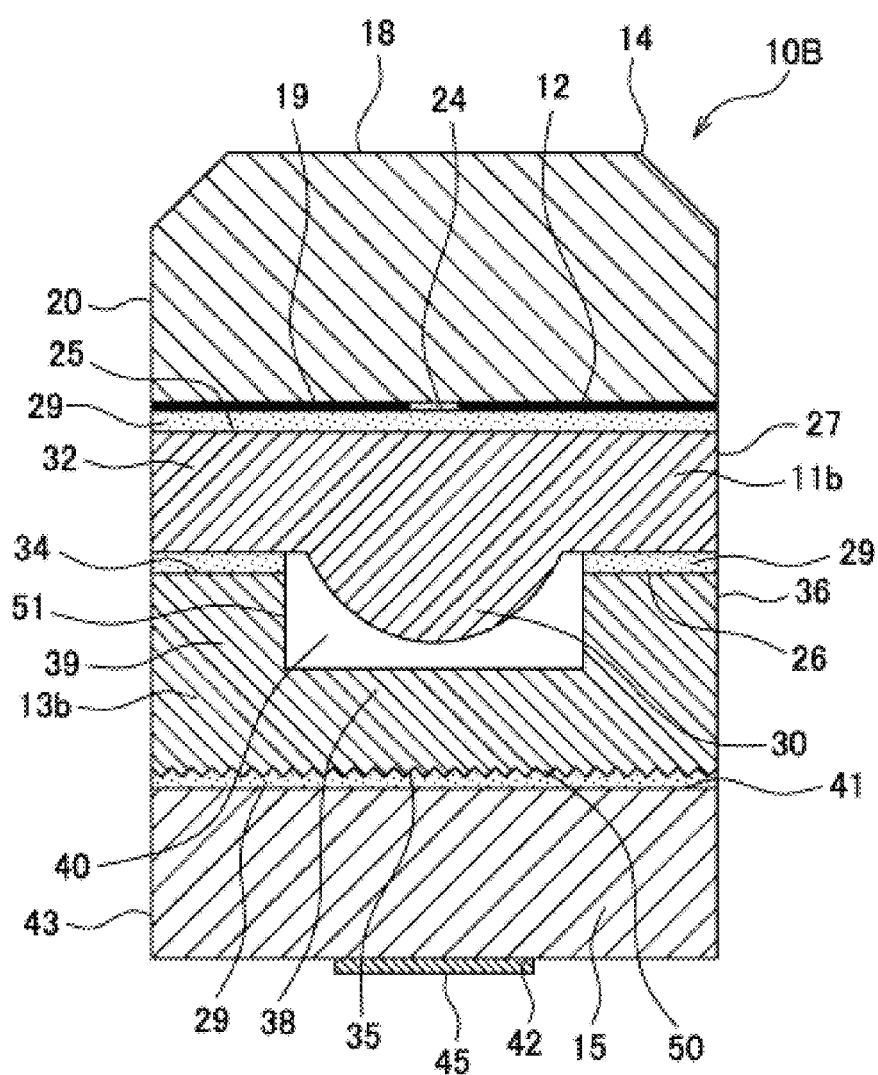
FIG. 5 is a cross-sectional view of a small lens unit according to a second embodiment taken along line A-A in FIG. 1.
Figure 6:
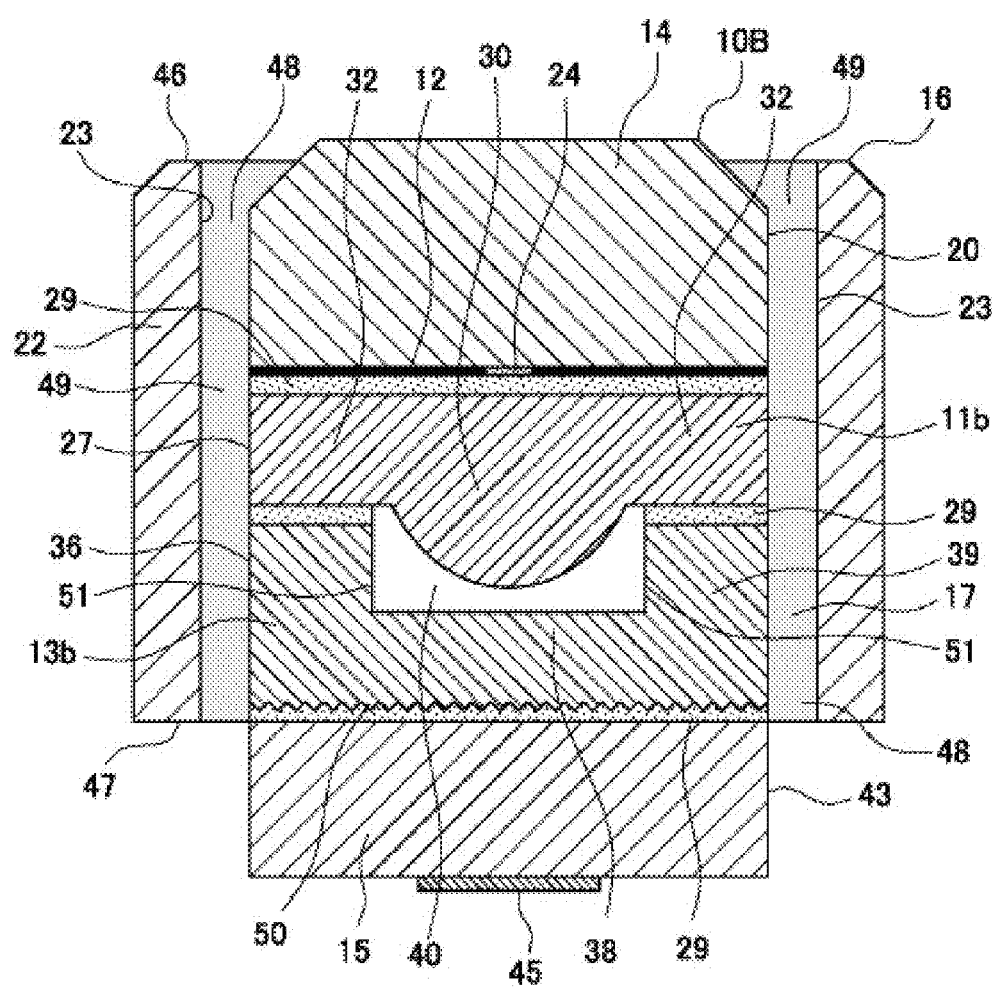
FIG. 6 is a cross-sectional view of the small lens unit according to the second embodiment housed in a holder taken along line B-B in FIG. 3.

FIG. 5 is a cross-sectional view of a small lens unit 10B according to a second embodiment taken along line A-A in FIG. 1. FIG. 6 is a cross-sectional view of the small lens unit 10B housed in the holder 16 taken along line B-B in FIG. 3. The small lens unit 10B according to the present embodiment is different from the first embodiment in that: the lens 11*b* does not include the annular concave part 31; the spaced-apart part 38 of the spacer 13*b* is concave rearward in the optical axis direction from the bonded peripheral part 39; and a plurality of sawtooth concave-convex parts 50 (a plurality of concave parts and convex parts) are formed at the rear end surface 35 of the spacer 13*b*. Other structures of the small lens unit 10B according to the present embodiment are identical to those of the small lens unit 10A according to the first embodiment. Accordingly, those structures are denoted by the same reference signs as the first embodiment, and the detailed description thereof is substituted by the description of the lens unit 10A according to the first embodiment.

The small lens unit 10B according to the present embodiment includes the lens 11*b*, the aperture pattern 12, and the spacer 13*b*. In the lens unit 10B, the cover member 14 and the sensor-dedicated cover member 15 are disposed. The cover member 14 is disposed at the front of the lens 11*b* in the optical axis direction. The sensor-dedicated cover member 15 is disposed behind the spacer 13*b* in the optical axis direction. The cover member 14, the aperture pattern 12, the lens 11*b*, the spacer 13*b*, and the sensor-dedicated cover member 15 are aligned in series in the optical axis direction and are integrated. As shown in FIG. 6, the cover member 14, the aperture pattern 12, the lens 11*b*, and the spacer 13*b* are housed in the housing space 17 of the holder 16. The cover member 14, the aperture pattern 12, the sensor-dedicated cover member 15, and the holder 16 of the lens unit 10B are identical to those of the lens unit 10A according to the first embodiment.

The lens 11*b* is formed of transparent glass or transparent synthetic resin. The radial cross-sectional shape of the lens 11*b* is a square (a quadrangle). The cross-sectional shape of the lens 11*b* is identical to the cross-sectional shape of the cover member 14, the spacer 13*b*, and the sensor-dedicated cover member 15. The lens 11*b* includes the front end surface 25, the rear end surface 26, the four side surfaces 27, and the four corners 28. The front end surface 25 is a flat surface on the object side (the cover member 14 side). The rear end surface 26 is a surface on the image side (the spacer 13*b* side) opposite to the front end surface 25. The four side surfaces 27 extend between the front end surface 25 and the rear end surface 26. The corners 28 are each located where the side surfaces 27 intersect. The front end surface 25 of the lens 11*b* is bonded by the transparent adhesive 29*a* to the rear end surface 19 (the aperture pattern 12) of the cover member 14. The adhesive 29*a* is different in refractive index from the transparent lens 11*b* and the transparent cover member 14 by 0.1 or less.

As shown in FIG. 6, the lens 11*b* is fitted into the middle part of the housing space 17 of the holder 16 to be positioned at the front of the spacer 13*b* in the optical axis direction. The four corners 28 of the lens 11*b* abut on the inner circumferential surface 23 of the barrel 22 of the holder 16. The barrel 22 of the holder 16 forms a circumcircle of the square cross-sectional shape of the lens 11*b*. Note that, at least two of the four corners 28 abutting on the inner circumferential surface 23 of the barrel 22 of the holder 16 will suffice.

The lens 11*b* includes the convex lens part 30 (a lens part) and the flange part 32 of a predetermined area. The convex lens part 30 is circular and formed at the center of the lens 11*b*. The convex lens part 30 is convex rearward in the optical axis direction toward the spacer 13b. The convex lens part 30 is a spherical lens, but it may be an aspheric lens. The flange part 32 extends radially outward from the outer periphery of the convex lens part 30 and surrounds the outer periphery of the convex lens part 30. The flange part 32 includes the rear end surface 26 that is flat and extends radially outward from the outer periphery of the convex lens part 30. The rear end surface 26 is positioned just slightly frontward in the optical axis direction from the center of the lens part 30.

The spacer 13b is formed of transparent glass or transparent synthetic resin. The spacer 13b includes the front end surface 34, the rear end surface 35, the four side surfaces 36, and the four corners 37. The front end surface 34 is on the object side (the lens 11b side). The rear end surface 35 is a surface on the image side (the sensor-dedicated cover member 15 side) opposite to the front end surface 34. The four side surfaces 36 extend between the front end surface 34 and the rear end surface 35. The corners 37 are each located where the side surfaces 36 intersect. The shape of the side surfaces 36 is a square prism (a quadrangular prism). The radial cross-sectional shape of the spacer 13b is a square (a quadrangle). The spacer 13b is identical in cross-sectional shape to the cover member 14, the lens 11b, and the sensor-dedicated cover member 15.

The spacer 13b is disposed behind the lens 11b in the optical axis direction and interposed between the lens 11b and the sensor-dedicated cover member 15. The spacer 13b has its length in the optical axis direction adjusted, and used for focusing the lens 11b. As shown in FIG. 6, the spacer 13b is fitted into the rear part in the housing space 17 of the holder 16 to be positioned at the front of the sensor-dedicated cover member 15 in the optical axis direction. The four corners 37 abut on the inner circumferential surface 23 of the barrel 22 of the holder 16. The barrel 22 of the holder 16 forms a circumcircle of the square cross-sectional shape of the spacer 13b. Note that, at least two of the four corners 37 abutting on the inner circumferential surface 23 of the barrel 22 of the holder 16 will suffice.

The spacer 13b includes the circular spaced-apart part 38 and the bonded peripheral part 39. The spaced-apart part 38 opposes to the convex lens part 30 of the lens 11b. The bonded peripheral part 39 has a predetermined area and opposes to the flange part 32 of the lens 11b. The spaced-apart part 38 is concave rearward in the optical axis direction from the bonded peripheral part 39. The front end surface 34 of the spaced-apart part 38 that extends flatly radially is spaced apart by a predetermined dimension rearward in the optical axis direction from the convex lens part 30. The bonded peripheral part 39 extends radially outward from the outer periphery of the spaced-apart part 38 and surrounds the spaced-apart part 38.

The bonded peripheral part 39 includes an inner side surface 51 and a front end surface 34. The inner side surface 51 extends straight rearward in the optical axis direction from the outer periphery of the spaced-apart part 38. The front end surface 34 is a flat surface that extends radially outward from the tip of the inner side surface 51. The front end surface 34 of the bonded peripheral part 39 is spaced apart by a predetermined dimension frontward in the optical axis direction from the front end surface 34 of the spaced-apart part 38. The front end surface 34 of the bonded peripheral part 39 is positioned at the front in the optical axis direction of the front end surface 34 of the spaced-apart part 38.

The front end surface 34 of the bonded peripheral part 39 abuts on the rear end surface 26 of the flange part 32. The front end surface 34 is bonded by the transparent adhesive 29b to substantially the entire area of the rear end surface 26 of the flange part 32. The space 40 is formed between the convex lens part 30 and the front end surface 34 of the spaced-apart part 38.

At the rear end surface 35 of the spacer 13b, a plurality of sawtooth concave-convex parts 50 (a plurality of concave parts and convex parts) juxtaposed to each other in the radial direction are formed. Note that, any concave-convex parts other than the sawtooth concave-convex parts may be formed at the rear end surface 35. Alternatively, similarly to the first embodiment, the rear end surface 35 of the spacer 13b may be flat. The front end surface 41 of the sensor-dedicated cover member 15 opposes to the rear end surface 35 of the spacer 13b. The front end surface 41 of the sensor-dedicated cover member 15 is bonded by the transparent adhesive 29c to the rear end surface 35 of the spacer 13b. The adhesive 29c is different in refractive index from the transparent spacer 13b and the transparent sensor-dedicated cover member 15 by 0.1 or less.

The adhesive 29c enters the concave-convex parts 50 formed at the rear end surface 35 of the spacer 13b. The anchoring effect of the adhesive 29c strongly fixes the front end surface 41 of the sensor-dedicated cover member 15 and the rear end surface 35 of the spacer 13b. Thus, even when a prescribed load acts on the spacer 13b and the sensor-dedicated cover member 15, the rear end surface 35 of the spacer 13b, the front end surface 41 of the sensor-dedicated cover member 15, and the surrounding region are surely prevented from being damaged or broken.

In the housing space 17 of the holder 16 having a circular radial cross-sectional shape, the cover member 14 and the small lens unit 10B each having a square (polygonal) radial cross-sectional shape are housed. Accordingly, between the side surfaces 20, 27, 36 (the outer circumferential surfaces) of the cover member 14 and the small lens unit 10B and the inner circumferential surface 23 of the barrel 22 of the holder 16, the gap 48 that extends in the optical axis direction is formed. The adhesive 49 (filler) fills up (is injected into) the gap 48 (the housing space 17). When the gap 48 allows entry of light, unwanted light can slightly enter the light receiving element 45. Here, filling the gap 48 with the light-blocking adhesive 49 will block any light that would otherwise enter the gap 48. This prevents any unwanted light from entering the light receiving element 45. Furthermore, the adhesive 49 fixes the cover member 14 and the small lens unit 10B to the housing space 17 of the holder 16. Note that, the gap 48 (the housing space 17) may not be filled with the adhesive 49.

In the small lens unit 10B, the rear end surface 26 of the flange part 32 is spaced apart frontward in the optical axis direction from the center of the convex lens part 30. The rear end surface 26 of the flange part 32 is positioned just slightly frontward in the optical axis direction from the center of the convex lens part 30. The front end surface 34 of the bonded peripheral part 39 of the spacer 13b is positioned at the front of the front end surface 34 of the spaced-apart part 38 in the optical axis direction. The spaced-apart part 38 of the spacer 13b is concave rearward in the optical axis direction from the bonded peripheral part 39. This increases the area of the rear end surface 26 of the flange part 32 and the bonding area of the rear end surface 26 of the flange part 32 to the front end surface 34 of the bonded peripheral part 39, without increasing the extending dimension of the flange part 32 rearward in the optical axis direction.

The rear end surface 26 of the flange part 32 that is positioned just slightly frontward in the optical axis direction from the convex lens part 30 abuts on the front end surface 34 of the bonded peripheral part 39 of the spacer 13b. The adhesive 29b bonds the rear end surface 26 of the flange part 32 and the front end surface 34 of the bonded peripheral part 39 of the spacer 13b. Accordingly, the rear end surface 26 of the flange part 32 and the front end surface 34 of the bonded peripheral part 39 are stably fixed. The adhesive 29b strongly fixes the rear end surface 26 of the flange part 32 and the front end surface 34 of the bonded peripheral part 39. Even when a prescribed load acts on the flange part 32, the rear end surface 26 of the flange part 32 and the surrounding region are prevented from being damaged or broken.

Third Embodiment

Figure 7:
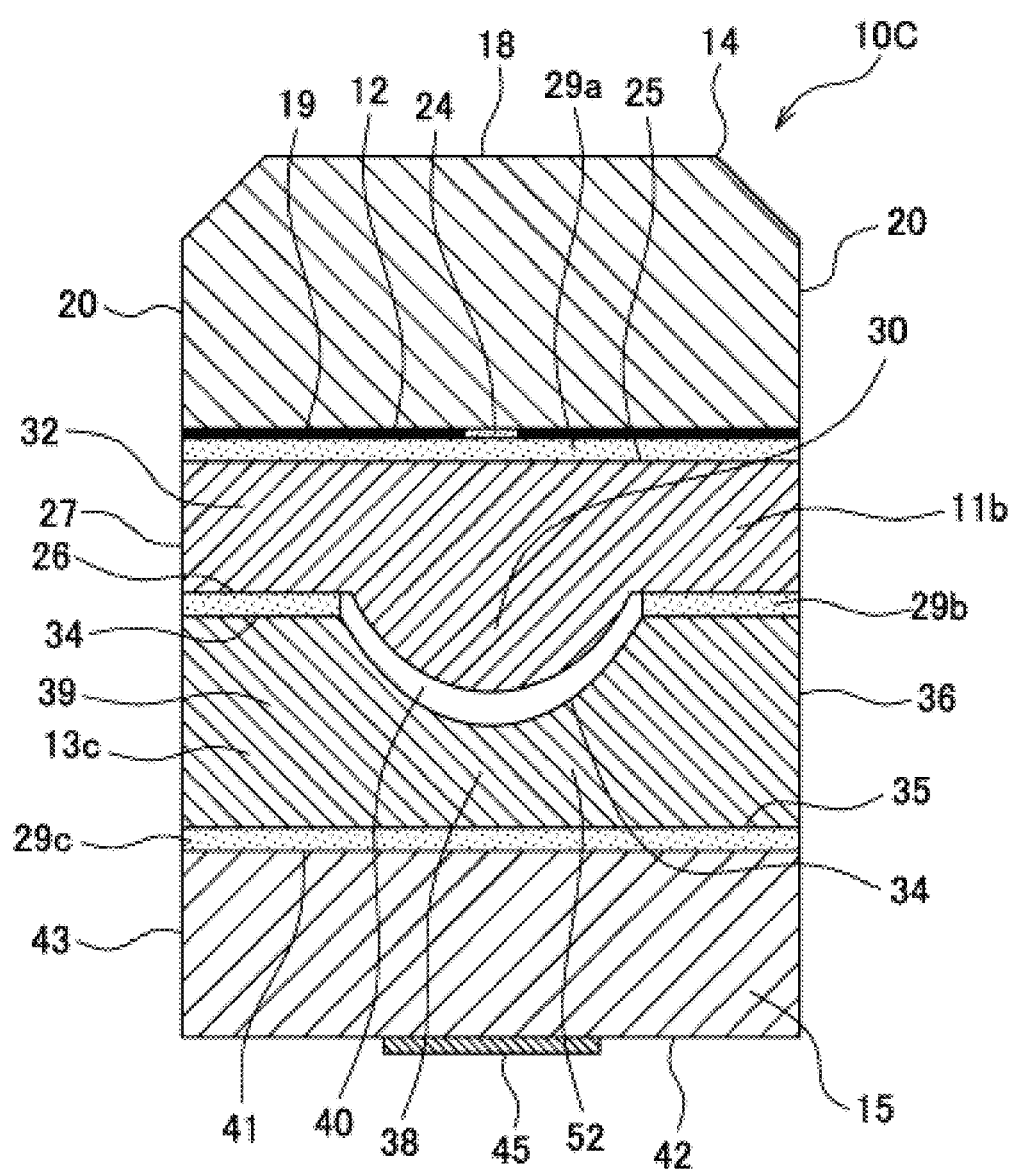
FIG. 7 is a cross-sectional view of a small lens unit according to a third embodiment taken along line A-A in FIG. 1.
Figure 8:
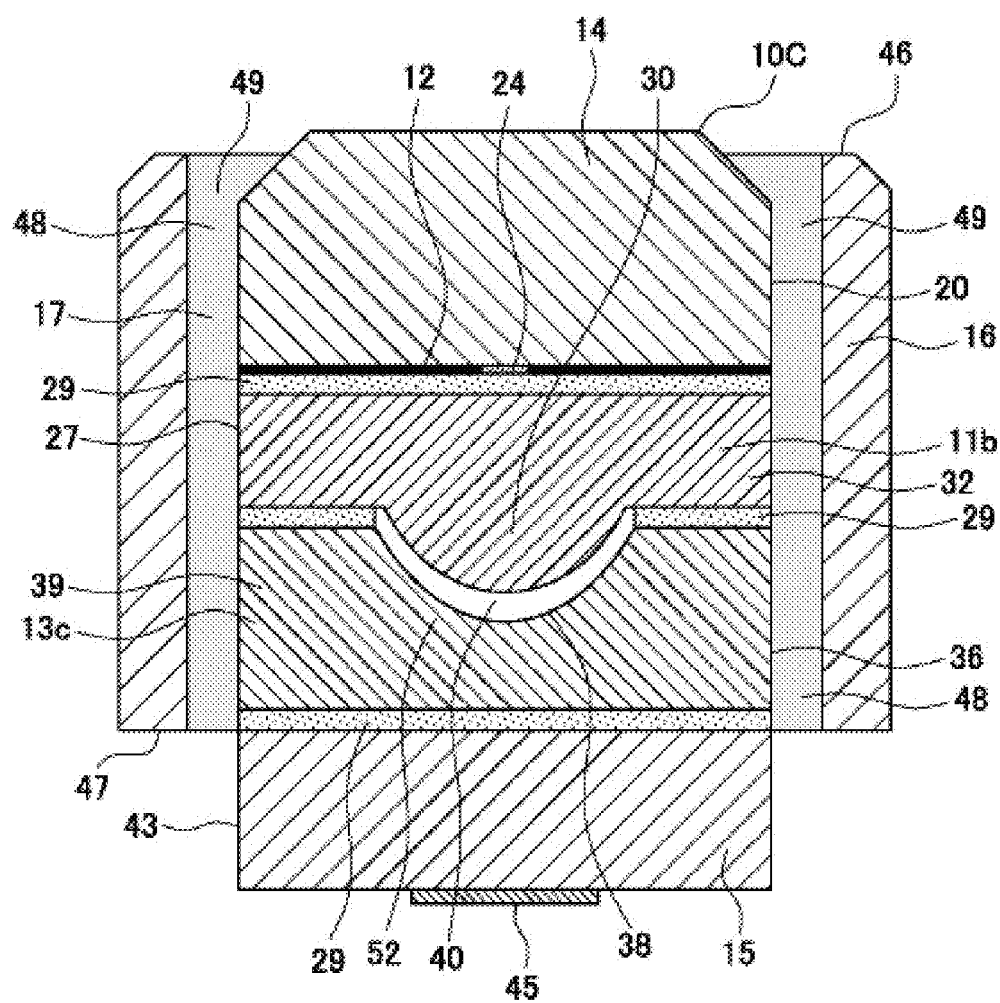
FIG. 8 is a cross-sectional view of the small lens unit according to the third embodiment housed in a holder taken along line B-B in FIG. 3.

FIG. 7 is a cross-sectional view of a small lens unit 10C according to a third embodiment taken along line A-A in FIG. 1. FIG. 8 is a cross-sectional view of the small lens unit 10C housed in the holder 16 taken along line B-B in FIG. 3. The small lens unit 10C according to the present embodiment is different from the first embodiment in that: the lens 11b does not include the annular concave part 31; the front end surface 34 of the spaced-apart part 38 of a spacer 13c forms a concave lens 52 that is concave rearward in the optical axis direction from the front end surface 34 of the bonded peripheral part 39. Other structures of the small lens unit 10C according to the present embodiment are identical to those of the small lens unit 10A according to the first embodiment. Accordingly, those structures are denoted by the same reference signs as the first embodiment, and the detailed description thereof is substituted by the description of the lens unit 10A according to the first embodiment.

The small lens unit 10C according to the present embodiment includes the lens 11b, the aperture pattern 12, and the spacer 13c. In the lens unit 10C, the cover member 14 and the sensor-dedicated cover member 15 are disposed. The cover member 14 is disposed at the front of the lens 11b in the optical axis direction. The sensor-dedicated cover member 15 is disposed behind the spacer 13c in the optical axis direction. The cover member 14, the aperture pattern 12, the lens 11b, the spacer 13c, and the sensor-dedicated cover member 15 are aligned in series in the optical axis direction and are integrated. As shown in FIG. 8, the cover member 14, the aperture pattern 12, the lens 11b, and the spacer 13c are housed in the housing space 17 of the holder 16. The cover member 14, the aperture pattern 12, the sensor-dedicated cover member 15, and the holder 16 of the lens unit 10C are identical to those of the lens unit 10A according to the first embodiment.

The lens 11b is identical to that of the lens unit 10B according to the second embodiment.

The spacer 13c is formed of transparent glass or transparent synthetic resin. The spacer 13c includes the front end surface 34, the rear end surface 35, the four side surfaces 36, and the four corners 37. The front end surface 34 is on the object side (the lens 11b side). The rear end surface 35 is a flat surface on the image side (the sensor-dedicated cover member 15 side) opposite to the front end surface 34. The four side surfaces 36 extend between the front end surface 34 and the rear end surface 35. The corners 37 are each located where the side surfaces 36 intersect. The shape of the side surfaces 36 is a square prism (a quadrangular prism). The radial cross-sectional shape of the spacer 13c is a square (a quadrangle). The spacer 13c is identical in cross-sectional shape to the cover member 14, the lens 11b, and the sensor-dedicated cover member 15.

The spacer 13c is disposed behind the lens 11b in the optical axis direction and interposed between the lens 11b and the sensor-dedicated cover member 15. The spacer 13c has its length in the optical axis direction adjusted, and used for focusing the lens 11b. As shown in FIG. 8, the spacer 13c is fitted into the rear part of the housing space 17 of the holder 16 to be positioned at the front of the sensor-dedicated cover member 15 in the optical axis direction. The four corners 37 abut on the inner circumferential surface 23 of the barrel 22 of the holder 16. The barrel 22 of the holder 16 forms a circumcircle of the square cross-sectional shape of the spacer 13c. Note that, at least two of the four corners 37 abutting on the inner circumferential surface 23 of the barrel 22 of the holder 16 will suffice.

The spacer 13c includes the circular spaced-apart part 38 and the bonded peripheral part 39. The spaced-apart part 38 opposes to the convex lens part 30 of the lens 11b. The bonded peripheral part 39 has a predetermined area and opposes to the flange part 32 of the lens 11b. The front end surface 34 of the spaced-apart part 38 is concave rearward in the optical axis direction toward the center of the spaced-apart part 38 from the front end surface 34 of the bonded peripheral part 39, to form the concave lens 52 that opposes to the convex lens part 30. The front end surface 34 of the spaced-apart part 38 (the concave lens 52) is spaced apart by a predetermined dimension rearward in the optical axis direction from the convex lens part 30.

The bonded peripheral part 39 extends radially outward from the outer periphery of the spaced-apart part 38 and surrounds the spaced-apart part 38. The front end surface 34 of the bonded peripheral part 39 extends flatly radially outward from the outer periphery of the spaced-apart part 38. The front end surface 34 of the bonded peripheral part 39 is spaced apart by a predetermined dimension frontward in the optical axis direction from the front end surface 34 of the spaced-apart part 38. The front end surface 34 of the bonded peripheral part 39 is positioned at the front of the front end surface 34 of the spaced-apart part 38 in the optical axis direction.

The front end surface 34 of the bonded peripheral part 39 abuts on the rear end surface 26 of the flange part 32. The front end surface 34 of the bonded peripheral part 39 is bonded by the transparent adhesive 29b to substantially the entire area of the rear end surface 26 of the flange part 32. The space 40 is formed between the lens part 30 and the front end surface 34 of the spaced-apart part 38.

The front end surface 41 of the sensor-dedicated cover member 15 opposes to the rear end surface 35 of the spacer 13c. The front end surface 41 of the sensor-dedicated cover member 15 is bonded by the transparent adhesive 29c to the rear end surface 35 of the spacer 13c. The adhesive 29c is different in refractive index from the transparent spacer 13c and the transparent sensor-dedicated cover member 15 by 0.1 or less. Note that, similarly to the spacer 13b, a plurality of concave-convex parts 50 may be formed at the rear end surface 35 of the spacer 13c. Alternatively, a concave part or a convex part may be formed at the rear end surface 35 of the spacer 13c.

In the housing space 17 of the holder 16 having a circular radial cross-sectional shape, the cover member 14 and the small lens unit 10C each having a square (polygonal) radial cross-sectional shape are housed. Accordingly, between the side surfaces 20, 27, 36 (the outer circumferential surfaces) of the cover member 14 and the small lens unit 10C and the inner circumferential surface 23 of the barrel 22 of the holder 16, the gap 48 that extends in the optical axis direction is formed. The adhesive 49 (filler) fills up (is injected into) the gap 48 (the housing space 17). When the gap 48 allows entry of light, unwanted light can slightly enter the light receiving element 45. Here, filling the gap 48 with the light-blocking adhesive 49 will block any light that would otherwise enter the gap 48. This prevents any unwanted light from entering the light receiving element 45. Furthermore, the adhesive 49 fixes the cover member 14 and the small lens unit 10C to the housing space 17 of the holder 16. Note that, the gap 48 (the housing space 17) may not be filled with the adhesive 49.

In the small lens unit 10C, the rear end surface 26 of the flange part 32 is spaced apart frontward in the optical axis direction from the center of the convex lens part 30. The rear end surface 26 of the flange part 32 is positioned just slightly frontward in the optical axis direction from the center of the convex lens part 30. The front end surface 34 of the bonded peripheral part 39 of the spacer 13c is positioned at the front of the front end surface 34 of the spaced-apart part 38 in the optical axis direction. The front end surface 34 of the spaced-apart part 38 of the spacer 13c forms the concave lens 52 that is concave rearward in the optical axis direction from the front end surface 34 of the bonded peripheral part 39. This increases the area of the rear end surface 26 of the flange part 32 and the bonding area of the rear end surface 35 of the flange part 32 to the front end surface 34 of the bonded peripheral part 39 of the spacer 13c, without increasing the extending dimension of the flange part 32 rearward in the optical axis direction.

The rear end surface 26 of the flange part 32 that is positioned just slightly frontward in the optical axis direction from the convex lens part 30 abuts on the front end surface 34 of the bonded peripheral part 39 of the spacer 13c. The adhesive 29b bonds the rear end surface 26 of the flange part 32 and the front end surface 34 of the bonded peripheral part 39 of the spacer 13c. Accordingly, the rear end surface 26 of the flange part 32 and the front end surface 34 of the bonded peripheral part 39 are stably fixed. The adhesive 29b strongly fixes the rear end surface 26 of the flange part 32 and the front end surface 34 of the bonded peripheral part 39. Even when a prescribed load acts on the spacer 13c and the flange part 32, the front end surface 34 of the bonded peripheral part 39, the rear end surface 26 of the flange part 32, and the surrounding region are prevented from being damaged or broken.

The front end surface 34 of the spaced-apart part 38 forms the concave lens 52 that is concave rearward in the optical axis direction toward the center of the spaced-apart part 38 from the front end surface 34 of the bonded peripheral part 39. This efficiently corrects curvature of field, which is one type of aberration that occurs at the convex lens part 30 disposed at the front of the spacer 13c. This realizes high optical performance with a smaller number of lenses. The concave lens 52 formed by the front end surface 34 of the spaced-apart part 38 increases the resolution of an image captured using the small lens unit 10C and improves the image quality.

Fourth Embodiment

Figure 9:
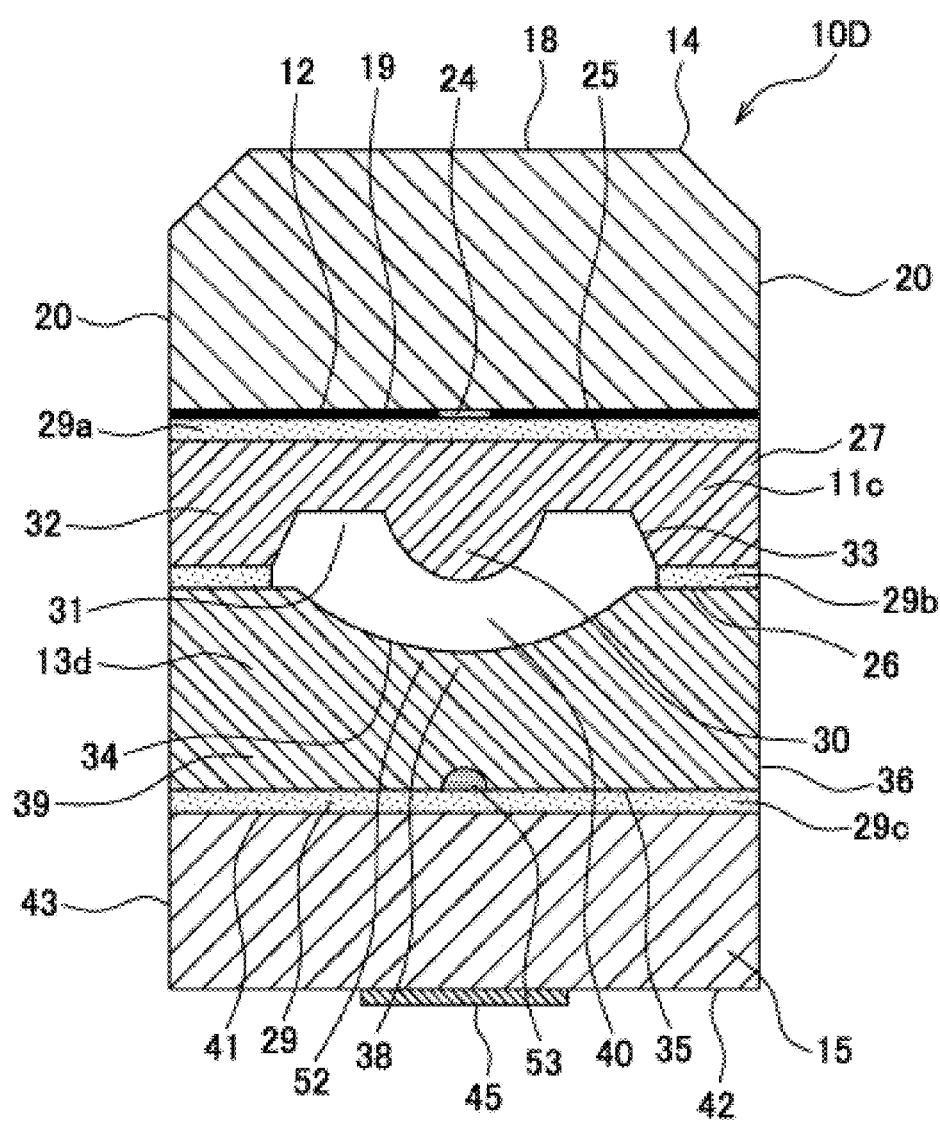
FIG. 9 is a cross-sectional view of a small lens unit according to a fourth embodiment taken along line A-A in FIG. 1.
Figure 10:
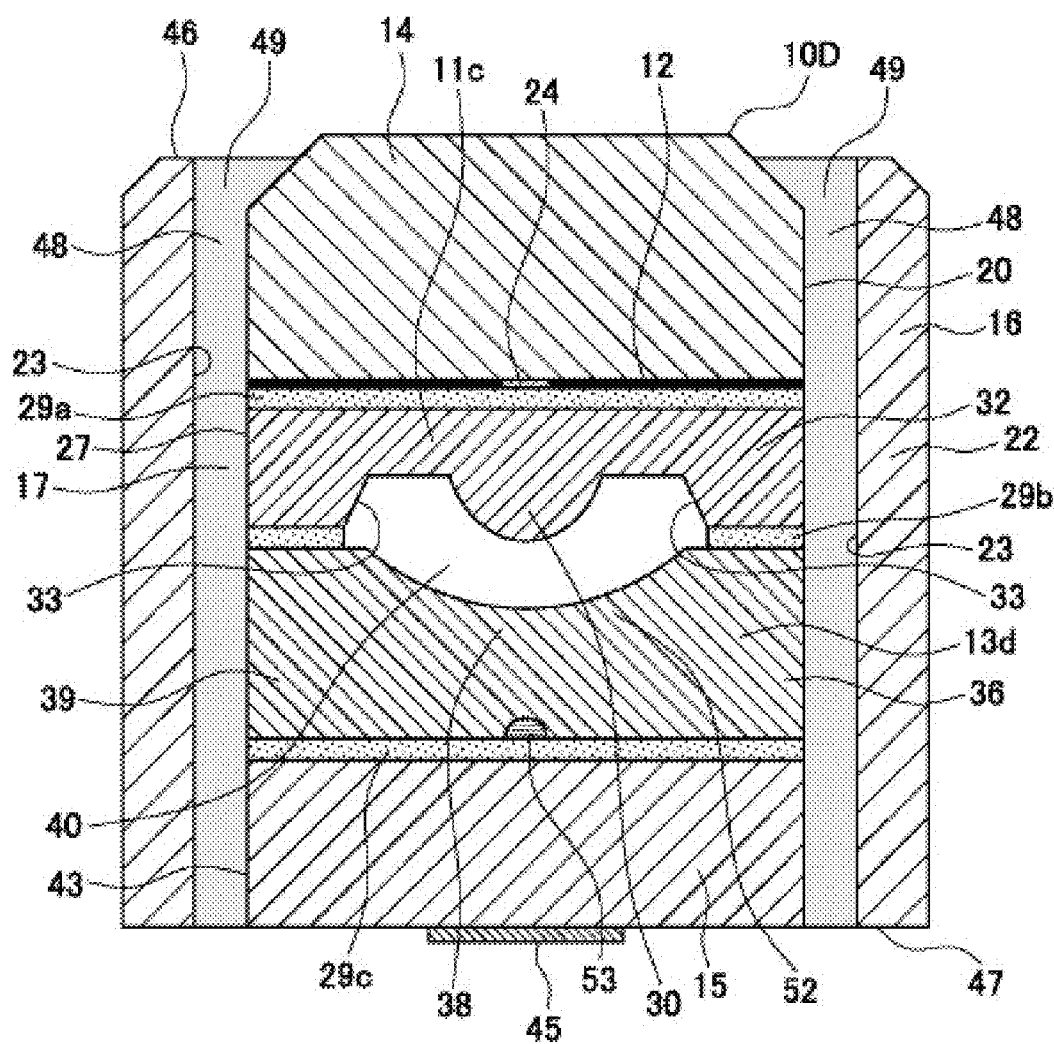
FIG. 10 is a cross-sectional view of the small lens unit according to the fourth embodiment housed in a holder taken along line B-B in FIG. 3.

FIG. 9 is a cross-sectional view of a small lens unit 10D according to a fourth embodiment taken along line A-A in FIG. 1. FIG. 10 is a cross-sectional view of the small lens unit 10D housed in the holder 16 taken along line B-B in FIG. 3. The small lens unit 10D according to the present embodiment is different from the first embodiment in that: the rear end surface 26 of the flange part 32 is spaced apart frontward in the optical axis direction from the center of the convex lens part 30, and the rear end surface 26 is positioned just slightly frontward in the optical axis direction from the center of the convex lens part 30; the front end surface 34 of the spaced-apart part 38 of a spacer 13d forms the concave lens 52 that is concave rearward in the optical axis direction from the front end surface 34 of the bonded peripheral part 39; the rear end surface 35 of the spacer 13d includes a concave part 53; and the sensor-dedicated cover member 15 is housed in the holder 16. Other structures of the small lens unit 10D according to the present embodiment are identical to those of the small lens unit 10A according to the first embodiment. Accordingly, those structures are denoted by the same reference signs as the first embodiment, and the detailed description thereof is substituted by the description of the lens unit 10A according to the first embodiment.

The small lens unit 10D according to the present embodiment includes a lens 11c, the aperture pattern 12, and a spacer 13d. In the lens unit 10D, the cover member 14 and the sensor-dedicated cover member 15 are disposed. The cover member 14 is disposed at the front of the lens 11c in the optical axis direction. The sensor-dedicated cover member 15 is disposed behind the spacer 13d in the optical axis direction. The cover member 14, the aperture pattern 12, the lens 11c, the spacer 13d, and the sensor-dedicated cover member 15 are aligned in series in the optical axis direction and are integrated. As shown in FIG. 10, the cover member 14, the aperture pattern 12, the lens 11c, the spacer 13d, and the sensor-dedicated cover member 15 are housed in the housing space 17 of the holder 16. The cover member 14, the aperture pattern 12, the sensor-dedicated cover member 15 of the lens unit 10D are identical to the lens unit 10A according to the first embodiment.

The lens 11c is formed of transparent glass or transparent synthetic resin. The radial cross-sectional shape of the lens 11c is a square (a quadrangle). The cross-sectional shape of the lens 11c is identical to the cross-sectional shape of the cover member 14, the spacer 13d, and the sensor-dedicated cover member 15. The lens 11c includes the front end surface 25, the rear end surface 26, the four side surfaces 27, and the four corners 28. The front end surface 25 is a flat surface on the object side (the cover member 14 side). The rear end surface 26 is on the side (the spacer 13d side) opposite to the front end surface 25. The four side surfaces 27 extend between the front end surface 25 and the rear end surface 26. The corners 28 are each located where the side surfaces 27 intersect. The lens 11c is positioned behind the aperture pattern 12 in the optical axis direction. The front end surface 25 of the lens 11c opposes to the rear end surface 19 (the aperture pattern 12) of the cover member 14. The front end surface 25 is bonded by the transparent adhesive 29a to the rear end surface 19 of the cover member 14. The adhesive 29a is different in refractive index from the transparent cover member 14 and the transparent lens 11c by 0.1 or less.

As shown in FIG. 10, the lens 11c is fitted into the middle part of the housing space 17 of the holder 16 to be positioned at the front of the spacer 13d in the optical axis direction. The four corners 28 of the lens 11c abut on the inner circumferential surface 23 of the barrel 22 of the holder 16. The barrel 22 of the holder 16 forms a circumcircle of the square cross-sectional shape of the lens 11c. Note that, at least two of the four corners 28 abutting on the inner circumferential surface 23 of the barrel 22 of the holder 16 will suffice.

The lens 11c includes the convex lens part 30 (the lens part), the annular concave part 31, and the flange part 32 of a predetermined area. The convex lens part 30 is circular and formed at the center of the lens 11c. The convex lens part 30 is convex rearward in the optical axis direction toward the spacer 13d. The convex lens part 30 is a spherical lens, but it may be an aspheric lens. The concave part 31 is concave frontward in the optical axis direction from the convex lens part 30 and the flange part 32. The concave part 31 is positioned between the convex lens part 30 and the flange part 32. The concave part 31 extends flatly radially outward from the periphery of the convex lens part 30 and surrounds the periphery of the convex lens part 30.

The flange part 32 extends radially outward from the outer periphery of the concave part 31 and surrounds the outer periphery of the concave part 31. The flange part 32 includes the inner side surface 33 and the rear end surface 26. The inner side surface 33 extends rearward in the optical axis direction from the outer periphery of the concave part 31 while increasing its width. The rear end surface 26 is a flat surface that extends radially outward from the tip of the inner side surface 33. The rear end surface 26 of the flange part 32 is spaced apart frontward in the optical axis direction from the center of the convex lens part 30. The rear end surface 26 is positioned just slightly frontward in the optical axis direction from the center of the convex lens part 30.

The spacer 13d is formed of transparent glass or transparent synthetic resin. The spacer 13d includes the front end surface 34, the rear end surface 35, the four side surfaces 36, and the four corners 37. The front end surface 34 is positioned on the object side (the lens 11c side). The rear end surface 35 is a surface on the image side (the sensor-dedicated cover member 15 side) opposite to the front end surface 34. The four side surfaces 36 extend between the front end surface 34 and the rear end surface 35. The corners 37 are each located where the side surfaces 36 intersect. The shape of the side surfaces 36 is a square prism (a quadrangular prism). The radial cross-sectional shape of the spacer 13d is a square (a quadrangle). The spacer 13d is identical in cross-sectional shape to the cover member 14, the lens 11c, and the sensor-dedicated cover member 15.

The spacer 13d is disposed behind the lens 11c in the optical axis direction and interposed between the lens 11c and the sensor-dedicated cover member 15. The spacer 13d has its length in the optical axis direction adjusted, and used for focusing the lens 11c. As shown in FIG. 10, the spacer 13d is fitted into the middle part of the housing space 17 of the holder 16 to be positioned at the front of the sensor-dedicated cover member 15 in the optical axis direction. The four corners 37 abut on the inner circumferential surface 23 of the barrel 22 of the holder 16. The barrel 22 of the holder 16 forms a circumcircle of the square cross-sectional shape of the spacer 13d and the sensor-dedicated cover member 15. Note that, at least two of the four corners 37 abutting on the inner circumferential surface 23 of the barrel 22 of the holder 16 will suffice.

The spacer 13d includes the circular spaced-apart part 38 and the bonded peripheral part 39. The spaced-apart part 38 opposes to the concave part 31 and the convex lens part 30 of the lens 11c. The bonded peripheral part 39 has a predetermined area and opposes to the flange part 32 of the lens 11c. The front end surface 34 of the spaced-apart part 38 is concave rearward in the optical axis direction toward the center of the spaced-apart part 38 from the front end surface 34 of the bonded peripheral part 39, to form the concave lens 52 that opposes to the concave part 31 and the convex lens part 30 of the lens 11c. The front end surface 34 of the spaced-apart part 38 (the concave lens 52) is spaced apart by a predetermined dimension rearward in the optical axis direction from the concave part 31 and the convex lens part 30 of the lens 11c.

The bonded peripheral part 39 extends radially outward from the outer periphery of the spaced-apart part 38 (the concave lens 52) and surrounds the spaced-apart part 38. The front end surface 34 of the bonded peripheral part 39 extends flatly radially outward from the outer periphery of the spaced-apart part 38 (the concave lens 52). The front end surface 34 of the bonded peripheral part 39 is spaced apart by a predetermined dimension frontward in the optical axis direction from the front end surface 34 of the spaced-apart part 38 (the concave lens 52). The front end surface 34 of the bonded peripheral part 39 is positioned at the front of the front end surface 34 of the spaced-apart part 38 in the optical axis direction.

The front end surface 34 of the bonded peripheral part 39 abuts on the rear end surface 26 of the flange part 32. The front end surface 34 is bonded by the transparent adhesive 29b to substantially the entire area of the rear end surface 26 of the flange part 32. The space 40 is formed between the convex lens part 30 and the front end surface 34 of the spaced-apart part 38 (the concave lens 52). The rear end surface 35 of the spacer 13d includes one concave part 53 that is concave frontward in the optical axis direction.

The front end surface 41 of the sensor-dedicated cover member 15 opposes to the rear end surface 35 of the spacer 13d. The front end surface 41 of the sensor-dedicated cover member 15 is bonded by the transparent adhesive 29c to the rear end surface 35 of the spacer 13d. The adhesive 29c is different in refractive index from the transparent lens 11c and the transparent sensor-dedicated cover member 15 by 0.1 or less. The adhesive 29c enters the concave part 53 formed at the rear end surface 35 of the spacer 13d. The anchoring effect of the adhesive 29c strongly fixes the front end surface 41 of the sensor-dedicated cover member 15 and the rear end surface 35 of the spacer 13d. Thus, even when a prescribed load acts on the spacer 13d and the sensor-dedicated cover member 15, the rear end surface 35 of the spacer 13d, the front end surface 41 of the sensor-dedicated cover member 15, and the surrounding region are surely prevented from being damaged or broken. Note that, a plurality of concave parts 53 may be formed at the rear end surface 35 of the spacer 13d. Alternatively, a convex part may be formed at the rear end surface 35 of the spacer 13d, or a plurality of concave-convex parts may be formed at the rear end surface 35 of the spacer 13d. The rear end surface 35 of the spacer 13d may be flat similarly to the rear end surface 35 of the spacer 13a according to the first embodiment.

In the housing space 17 of the holder 16 having a circular radial cross-sectional shape, the cover member 14 and the small lens unit 10D each having a square (polygonal) radial cross-sectional shape are housed. Accordingly, between the side surfaces 20, 27, 36 (the outer circumferential surfaces) of the cover member 14 and the small lens unit 10D and the inner circumferential surface 23 of the barrel 22 of the holder 16, the gap 48 that extends in the optical axis direction is formed. The adhesive 49 (filler) fills up (is injected into) the gap 48 (the housing space). When the gap 48 allows entry of light, unwanted light can slightly enter the light receiving element 45. Here, filling the gap 48 with the light-blocking adhesive 49 will block any light that would otherwise enter the gap 48. This prevents any unwanted light from entering the light receiving element 45. Furthermore, the adhesive 49 fixes the cover member 14 and the small lens unit 10D to the housing space 17 of the holder 16. Note that, the gap 48 (the housing space 17) may not be filled with the adhesive 49.

In the small lens unit 10D, the rear end surface 26 of the flange part 32 is spaced apart frontward in the optical axis direction from the center of the convex lens part 30. The rear end surface 26 of the flange part 32 is positioned just slightly frontward in the optical axis direction from the center of the convex lens part 30. The front end surface 34 of the bonded peripheral part 39 of the spacer 13d is positioned at the front of the front end surface 34 of the spaced-apart part 38 in the optical axis direction. The front end surface 34 of the spaced-apart part 38 of the spacer 13d forms the concave lens 52 that is concave rearward in the optical axis direction from the front end surface 34 of the bonded peripheral part 39. This increases the area of the rear end surface 26 of the flange part 32 and the bonding area of the rear end surface 26 of the flange part 32 to the front end surface 34 of the bonded peripheral part 39, without increasing the extending dimension of the flange part 32 rearward in the optical axis direction.

The rear end surface 26 of the flange part 32 that is positioned just slightly frontward in the optical axis direction from the convex lens part 30 abuts on the front end surface 34 of the bonded peripheral part 39 of the spacer 13d. The adhesive 29b bonds the rear end surface 26 of the flange part 32 and the front end surface 34 of the bonded peripheral part 39. Accordingly, the rear end surface 26 of the flange part 32 and the front end surface 34 of the bonded peripheral part 39 are stably fixed. The adhesive 29b strongly fixes the rear end surface 26 of the flange part 32 and the front end surface 34 of the bonded peripheral part 39. Even when a prescribed load acts on the flange part 32 and the bonded peripheral part 39 of the spacer 13d, the rear end surface 26 of the flange part 32, the front end surface 34 of the spacer 13d, and the surrounding region are prevented from being damaged or broken.

The front end surface 34 of the spaced-apart part 38 of the spacer 13d forms the concave lens 52 that is concave rearward in the optical axis direction toward the center of the spaced-apart part 38 from the front end surface 34 of the bonded peripheral part 39. This efficiently corrects curvature of field, which is one type of aberration that occurs at the convex lens part 30 disposed at the front of the spacer 13d. This realizes high optical performance with a smaller number of lenses. The concave lens 52 formed by the front end surface 34 of the spaced-apart part 38 of the spacer 13d increases the resolution of an image captured using the small lens unit 10D and improves the image quality.

Fifth Embodiment

Figure 11:
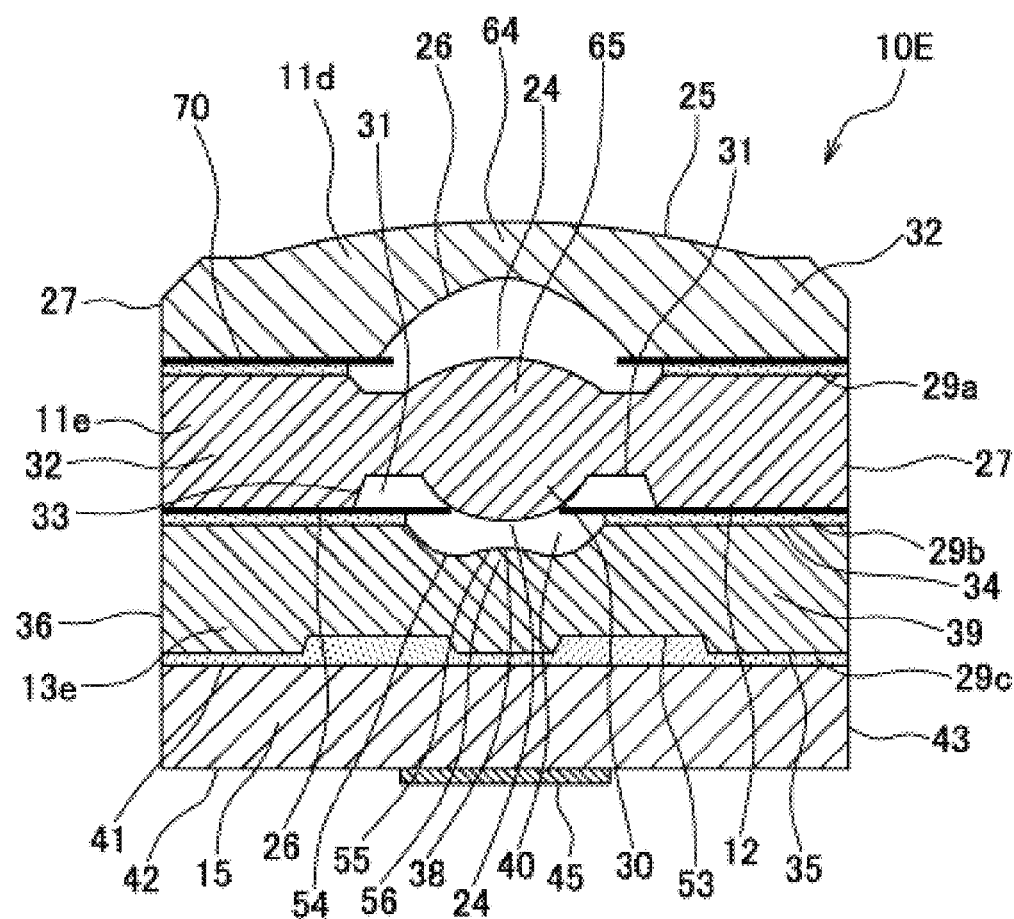
FIG. 11 is a cross-sectional view of a small lens unit according to a fifth embodiment taken along line A-A in FIG. 1.
Figure 12:
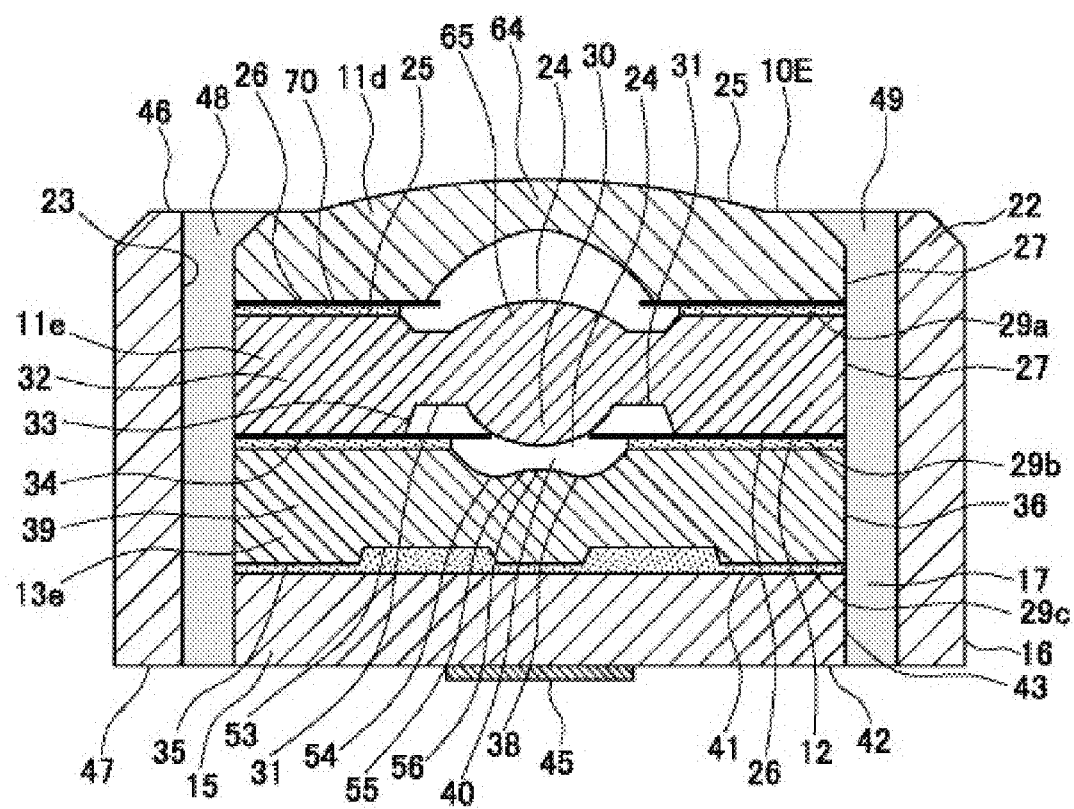
FIG. 12 is a cross-sectional view of the small lens unit according to the fifth embodiment housed in a holder taken along line B-B in FIG. 3.

FIG. 11 is a cross-sectional view of a lens unit 10E according to a fifth embodiment taken along line A-A in FIG. 1. FIG. 12 is a cross-sectional view of the lens unit 10E housed in the holder 16 taken along line B-B in FIG. 3. The lens unit 10E according to the present embodiment is different from the first embodiment in that: no cover member 14 is disposed; two first and second lenses 11d, 11e are aligned in the optical axis direction; the first lens 11d forms a concave lens 64 that is concave frontward in the optical axis direction; the front end surface 25 of the second lens 11e forms a concave lens part 65 that is concave frontward in the optical axis direction; the front end surface 34 of the spaced-apart part 38 of a spacer 13e forms a lens 56 that includes a concave portion 54 that is concave rearward in the optical axis direction from the front end surface 34 of the bonded peripheral part 39 and a convex portion 55 that is convex frontward in the optical axis direction toward the center of the spaced-apart part 38 from the inner periphery of the concave portion 54; the concave part 53 is formed at the rear end surface 35 of the spacer 13e; a light blocking plate 70 is disposed between the first lens 11d and the second lens 11e; and a diaphragm 12 (aperture-setting means) is disposed between the second lens 11e and the spacer 13e. Other structures of the small lens unit 10E according to the present embodiment are identical to those of the small lens unit 10A according to the first embodiment. Accordingly, those structures are denoted by the same reference signs as the first embodiment, and the detailed description thereof is substituted by the description of the lens unit 10A according to the first embodiment.

The lens unit 10E according to the present embodiment includes the first lens 11d, the second lens 11e, the diaphragm 12, and the spacer 13e. The second lens 11e is positioned behind the first lens 11d (the light blocking plate 70) in the optical axis direction. The spacer 13e is positioned behind the second lens 11e (the diaphragm 12) in the optical axis direction. The sensor-dedicated cover member 15 is disposed behind the spacer 13e in the optical axis direction. While the lens unit 10E includes two pieces of lenses, namely, the first lens 11d and the second lens 11e, the number of lenses is not particularly specified. The lens unit 10E may include three or more pieces of lenses aligned in the optical axis direction, namely, a first lens (a convex lens or a concave lens) to an n-th lens (a convex lens or a concave lens).

The first lens 11d, the light blocking plate 70, the second lens 11e, the diaphragm 12, the spacer 13e, and the sensor-dedicated cover member 15 are aligned in series in the optical axis direction and are integrated. As shown in FIG. 12, the first lens 11d, the light blocking plate 70, the second lens 11e, the diaphragm 12, the spacer 13e, and the sensor-dedicated cover member 15 are housed in the housing space 17 of the holder 16.

The first lens 11d is formed of transparent glass (cover glass) or transparent synthetic resin. The first lens 11d includes the front end surface 25, the rear end surface 26, the four side surfaces 27, and the four corners 28. The front end surface 25 is on the object side. The rear end surface 26 is a plane on the image side (the second lens 11e side) opposite to the front end surface 25. The four side surfaces 27 extend between the front end surface 25 and the rear end surface 26. The corners 28 are each located where the side surfaces 27 intersect.

The shape of the side surfaces 27 is a square prism (a quadrangular prism). The radial cross-sectional shape of the first lens 11d is a square (a quadrangle). The center of the front end surface 25 of the first lens 11d is concave frontward in the optical axis direction. The center of the rear end surface 26 of the first lens 11d is concave frontward in the optical axis direction. Thus, the first lens 11d forms the concave lens 64 whose center is concave frontward in the optical axis direction. The flange part 32 of the first lens 11d surrounds the outer periphery of the concave lens 64.

As shown in FIG. 12, the first lens 11d is fitted into the front part in the housing space 17 of the holder 16. The four corners 28 abut on the inner circumferential surface 23 of the barrel 22 of the holder 16. The barrel 22 of the holder 16 forms a circumcircle of the square cross-sectional shape of the first lens 11d. Note that, at least two of the four corners 28 abutting on the inner circumferential surface 23 of the barrel 22 of the holder 16 will suffice. The shape of the side surfaces 27 may be, in place of a quadrangular prism, any polygonal prism (such as a triangular prism, a pentagonal prism, and a hexagonal prism) or a circular cylinder. The radial cross-sectional shape of the first lens 11d may be, in place of a quadrangle, any polygon (such as a triangle, a pentagon, a hexagon) or a circle.

The light blocking plate 70 is disposed between the first lens 11d and the second lens 11e, and at the rear end surface 26 of the first lens 11d. The light blocking plate 70 is disposed behind the first lens 11d in the optical axis direction. A circular hole 24 is formed at the center of the light blocking plate 70. The diaphragm 12 is disposed between the second lens 11e and the spacer 13e, and at the rear end surface 26 of the second lens 11e. The diaphragm 12 is positioned behind the second lens 11e in the optical axis direction. A circular hole 24 (an aperture hole) is formed at the center of the diaphragm 12.

The second lens 11e is formed of transparent glass or transparent synthetic resin. The second lens 11e includes the front end surface 25, the rear end surface 26, the four side surfaces 27, and the four corners 28. The front end surface 25 is on the object side (the first lens 11d side). The rear end surface 26 is a plane on the image side (the spacer 13e side) opposite to the front end surface 25. The four side surfaces 27 extend between the front end surface 25 and the rear end surface 26. The corners 28 are each located where the side surfaces 27 intersect. The second lens 11e is positioned behind the light blocking plate 70 (the first lens 11d) in the optical axis direction. The radial cross-sectional shape of the second lens 11e is a square (a quadrangle). The second lens 11e is identical in cross-sectional shape to the first lens 11d.

The front end surface 25 of the second lens 11e forms the circular concave lens part 65 whose center is concave frontward in the optical axis direction. The rear end surface 26 of the second lens 11e forms the circular convex lens 30 whose center is convex rearward in the optical axis direction. The concave lens part 65 and the convex lens part 30 are each a spherical lens, but they may each be an aspheric lens. The concave part 31 is concave frontward in the optical axis direction from the convex lens part 30 and the flange part 32. The concave part 31 is positioned between the convex lens part 30 and the flange part 32. The concave part 31 extends flatly radially outward from the periphery of the convex lens part 30 and surrounds the periphery of the convex lens part 30.

The flange part 32 of the second lens 11e surrounds the outer periphery of the concave lens part 65, and surrounds the outer periphery of the concave part 31. The flange part 32 of the second lens 11e includes the inner side surface 33 and the rear end surface 26. The inner side surface 33 extends rearward in the optical axis direction from the outer periphery of the concave part 31 while increasing its width. The rear end surface 26 is a flat surface that extends radially outward from the tip of the inner side surface 33. The rear end surface 26 of the flange part 32 of the second lens 11e is spaced apart rearward in the optical axis direction from the center of the convex lens part 30. The rear end surface 26 is positioned just slightly rearward in the optical axis direction from the center of the convex lens part 30.

The front end surface 25 of the flange part 32 of the second lens 11e opposes to the rear end surface 26 of the flange part 32 (the light blocking plate 70) of the first lens 11d. The front end surface 25 of the flange part 32 of the second lens 11e is bonded by the transparent adhesive 29a to the rear end surface 26 of the flange part 32 of the first lens 11d. The adhesive 29a is different in refractive index from the first and second lenses 11d, 11e by 0.1 or less.

As shown in FIG. 12, the second lens 11e is fitted into the middle part of the housing space 17 of the holder 16 to be positioned at the front of the spacer 13e in the optical axis direction. The four corners 28 abut on the inner circumferential surface 23 of the barrel 22 of the holder 16. The barrel 22 of the holder 16 forms a circumcircle of the square cross-sectional shape of the second lens 11e. Note that, at least two of the four corners 28 abutting on the inner circumferential surface 23 of the barrel 22 of the holder 16 will suffice.

The spacer 13e is formed of transparent glass or transparent synthetic resin. The spacer 13e includes the front end surface 34, the rear end surface 35, the four side surfaces 36, and the four corners 37. The front end surface 34 is on the object side (the second lens 11e side). The rear end surface 35 is a surface on the image side (the sensor-dedicated cover member 15 side) opposite to the front end surface 34. The four side surfaces 36 extend between the front end surface 34 and the rear end surface 35. The corners 37 are each located where the side surfaces 36 intersect. The shape of the side surfaces 36 is a square prism (a quadrangular prism). The radial cross-sectional shape of the spacer 13e is a square (a quadrangle). The spacer 13e is identical in cross-sectional shape to the first lens 11d, the second lens 11e, and the sensor-dedicated cover member 15.

The spacer 13e is disposed behind the second lens 11e in the optical axis direction and interposed between the second lens 11e and the sensor-dedicated cover member 15. The spacer 13e has its length in the optical axis direction adjusted, and used for adjusting the focus defined by the first lens 11d (the concave lens 64) and the second lens 11e (the convex lens part 30 and the concave lens part 65). As shown in FIG. 12, the spacer 13e is fitted into the middle part of the housing space 17 of the holder 16 to be positioned at the front of the sensor-dedicated cover member 15 in the optical axis direction. The four corners 37 abut on the inner circumferential surface 23 of the barrel 22 of the holder 16. The barrel 22 of the holder 16 forms a circumcircle of the square cross-sectional shape of the spacer 13e. Note that, at least two of the four corners 37 abutting on the inner circumferential surface 23 of the barrel 22 of the holder 16 will suffice.

The spacer 13e includes the circular spaced-apart part 38 and the bonded peripheral part 39. The spaced-apart part 38 is opposed to the concave part 31 and the convex lens part 30 of the second lens 11e. The bonded peripheral part 39 has a predetermined area and opposes to the flange part 32 of the second lens 11e. The front end surface 34 of the spaced-apart part 38 forms the lens 56 that includes the concave portion 54 and the convex portion 55. The concave portion 54 is circular and concave rearward in the optical axis direction from the front end surface 34 of the bonded peripheral part 39. The convex portion 55 is circular and convex frontward in the optical axis direction toward the center of the spaced-apart part 38 from the inner periphery of the concave portion 54. The front end surface 34 of the spaced-apart part 38 (the lens 56 that includes the concave portion 54 and the convex portion 55) is spaced apart by a predetermined dimension rearward in the optical axis direction from the concave part 31 and the convex lens part 30 of the second lens 11e.

The bonded peripheral part 39 extends radially outward from the outer periphery of the spaced-apart part 38 and surrounds the spaced-apart part 38. The front end surface 34 of the bonded peripheral part 39 extends flatly radially outward from the outer periphery of the spaced-apart part 38. The front end surface 34 of the bonded peripheral part 39 is spaced apart by a predetermined dimension frontward in the optical axis direction from the front end surface 34 of the spaced-apart part 38. The front end surface 34 of the bonded peripheral part 39 is positioned at the front of the front end surface 34 of the spaced-apart part 38 in the optical axis direction.

The front end surface 34 of the bonded peripheral part 39 abuts on the rear end surface 26 of the flange part 32 of the second lens 11e. The front end surface 34 of the bonded peripheral part 39 is bonded by the transparent adhesive 29b to substantially the entire area of the rear end surface 26 of the flange part 32 of the second lens 11e. The space 40 is formed between the convex lens part 30 of the second lens 11e and the front end surface 34 of the spaced-apart part 38.

The front end surface 41 of the sensor-dedicated cover member 15 opposes to the rear end surface 35 of the spacer 13e. The front end surface 41 of the sensor-dedicated cover member 15 is bonded by the transparent adhesive 29c to the rear end surface 35 of the spacer 13e. The adhesive 29c is different in refractive index from the transparent spacer 13e and the transparent sensor-dedicated cover member 15 by 0.1 or less. Note that, a convex part may be formed at the rear end surface 35 of the spacer 13e. Alternatively, a plurality of concave-convex parts 50 may be formed at the rear end surface 35 of the spacer 13e. The rear end surface 35 of the spacer 13e may not include the concave part 53 and may be flat.

The adhesive 29c enters the concave part 53 formed at the rear end surface 35 of the spacer 13e, and the anchoring effect of the adhesive 29c strongly fixes the front end surface 41 of the sensor-dedicated cover member 15 and the rear end surface 35 of the spacer 13e. Even when a prescribed load acts on the spacer 13e and the sensor-dedicated cover member 15, the rear end surface 35 of the spacer 13e, the front end surface 41 of the sensor-dedicated cover member 15, and the surrounding region are surely prevented from being damaged or broken.

In the housing space 17 of the holder 16 having a circular radial cross-sectional shape, the small lens unit 10E (the first lens 11d, the second lens 11e, the spacer 13e), and the sensor-dedicated cover member 15 each having a square (polygonal) radial cross-sectional shape are housed. Accordingly, between the side surfaces 27, 36, 43 (the outer circumferential surfaces) of the small lens unit 10E and the sensor-dedicated cover member 15 and the inner circumferential surface 23 of the barrel 22 of the holder 16, the gap 48 that extends in the optical axis direction is formed. The adhesive 49 (filler) fills up (is injected into) the gap 48 (the housing space 17). When the gap 48 allows entry of light, unwanted light can slightly enter the light receiving element 45. Here, filling the gap 48 with the light-blocking adhesive 49 will block any light that would otherwise enter the gap 48. This prevents any unwanted light from entering the light receiving element 45. The adhesive 49 fixes the small lens unit 10E and the sensor-dedicated cover member 15 to the housing space 17 of the holder 16. Note that, the gap 48 (the housing space 17) may not be filled with the adhesive 49.

In the small lens unit 10E, the rear end surface 26 of the flange part 32 of the second lens 11e is spaced apart rearward in the optical axis direction from the center of the convex lens part 30. The rear end surface 26 of the flange part 32 is positioned just slightly rearward in the optical axis direction from the center of the convex lens part 30. The second lens 11e includes the concave part 31 that is positioned between the convex lens part 30 and the flange part 32 and concave frontward in the optical axis direction from the convex lens part 30 and the flange part 32. The front end surface 34 of the spaced-apart part 38 of the spacer 13e forms the lens 56 that has the concave portion 54 that is concave rearward in the optical axis direction from the front end surface 34 of the bonded peripheral part 39 and the convex portion 55 that is convex frontward in the optical axis direction toward the center of the spaced-apart part 38 from the inner periphery of the concave portion 54. This increases the area of the rear end surface 26 of the flange part 32 and the bonding area of the rear end surface 26 of the flange part 32 of the second lens 11e to the front end surface 34 of the bonded peripheral part 39 of the spacer 13e, without increasing the extending dimension of the flange part 32 of the second lens 11e rearward in the optical axis direction.

The rear end surface 26 of the flange part 32 that is positioned just slightly rearward in the optical axis direction from the convex lens part 30 of the second lens 11e abuts on the front end surface 34 of the bonded peripheral part 39 that is positioned at the front of the front end surface 34 of the spaced-apart part 38 of the spacer 13e in the optical axis direction. The adhesive 29b bonds the rear end surface 26 of the flange part 32 of the second lens 11e and the front end surface 34 of the bonded peripheral part 39 of the spacer 13e. Accordingly, the rear end surface 26 of the flange part 32 of the second lens 11e and the front end surface 34 of the bonded peripheral part 39 are stably fixed. The adhesive 29b strongly fixes the rear end surface 26 of the flange part 32 of the second lens 11e and the front end surface 34 of the bonded peripheral part 39. Even when a prescribed load acts on the flange part 32 of the second lens 11e and the bonded peripheral part 39, the rear end surface 26 of the flange part 32 of the second lens 11e, the front end surface 34 of the bonded peripheral part 39, and the surrounding region are prevented from being damaged or broken.

The front end surface 34 of the spaced-apart part 38 of the spacer 13e forms the lens 56 that includes the concave portion 54 that is concave rearward in the optical axis direction from the front end surface 34 of the bonded peripheral part 39 and the convex portion 55 that is convex frontward in the optical axis direction toward the center of the spaced-apart part 38 from the inner periphery of the concave portion 54. This efficiently corrects curvature of field, which is one type of aberration that occurs at the convex lens part 30 disposed at the front of the spacer 13e. This realizes high optical performance with a smaller number of lenses. The lens 56 formed by the front end surface 34 of the spaced-apart part 38 of the spacer 13e increases the resolution of an image captured using the small lens unit E and improves the image quality.

Sixth Embodiment

Figure 13:
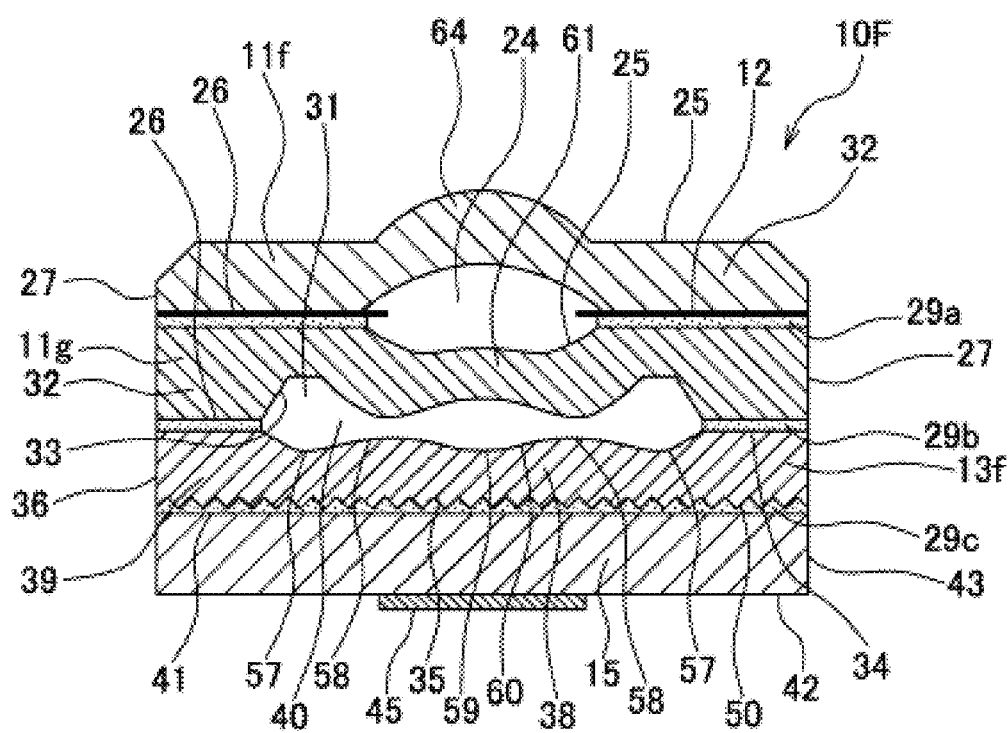
FIG. 13 is a cross-sectional view of a small lens unit according to a sixth embodiment taken along A-A in FIG. 1.
Figure 14:
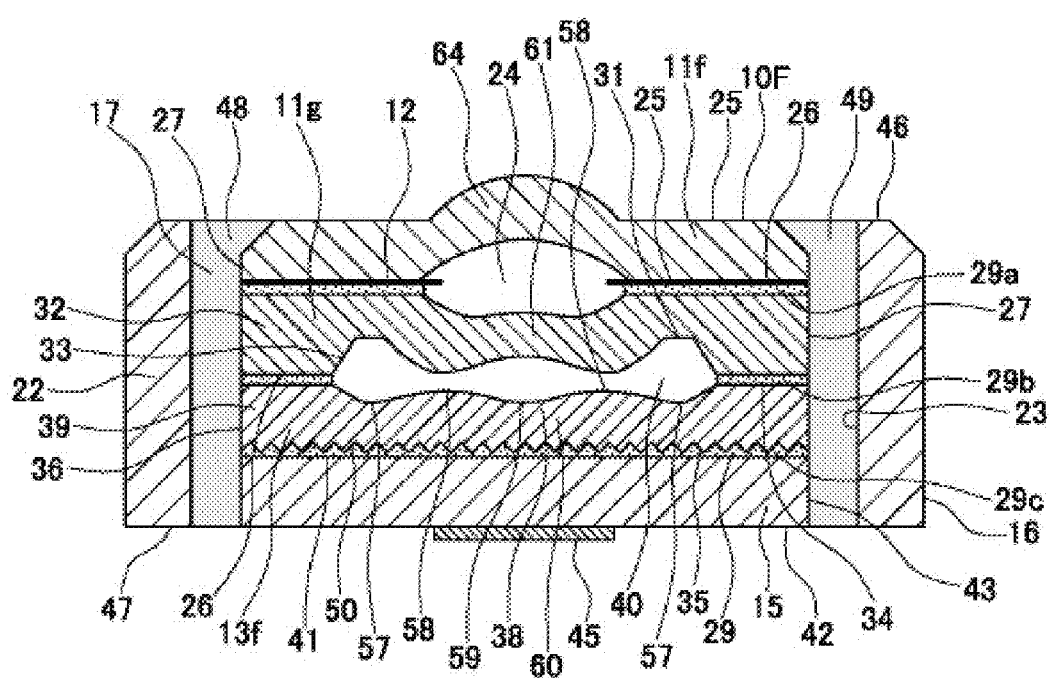
FIG. 14 is a cross-sectional view of the small lens unit according to the sixth embodiment housed in a holder taken along line B-B in FIG. 3.

FIG. 13 is a cross-sectional view of a small lens unit 10F according to the sixth embodiment taken along line A-A in FIG. 1. FIG. 14 is a cross-sectional view of the small lens unit 10F housed in the holder 16 taken along line B-B in FIG. 3. The small lens unit 10F according to the present embodiment is different from the first embodiment in that: no cover member 14 is disposed; two first and second lenses 11f, 11g are aligned in the optical axis direction; the first lens 11f forms the concave lens 64 that is concave frontward in the optical axis direction; the front end surface 25 and the rear end surface 26 of the second lens 11g form the concave lens part 61 that is concave frontward in the optical axis direction; and the front end surface 34 of the spaced-apart part 38 of the spacer 13f forms a lens 60 that includes a first concave portion 57 that is concave rearward in the optical axis direction from the front end surface 34 of the bonded peripheral part 39, a convex portion 58 that is convex frontward in the optical axis direction from the inner periphery of the first concave portion 57, and a second concave portion 59 that is concave rearward in the optical axis direction toward the center of the spaced-apart part 38 from the inner periphery of the convex portion 58. Other structures of the small lens unit 10F according to the present embodiment are identical to those of the small lens unit 10A according to the first embodiment. Accordingly, those structures are denoted by the same reference signs as the first embodiment, and the detailed description thereof is substituted by the description of the lens unit 10A according to the first embodiment.

The lens unit 10F according to the present embodiment includes the first lens 11*f*, the second lens 11*g*, the diaphragm 12, and the spacer 13*f*. The second lens 11*g* is positioned behind the first lens 11*f* (the diaphragm 12) in the optical axis direction. The spacer 13*f* is positioned behind the second lens 11*g* in the optical axis direction. The sensor-dedicated cover member 15 is disposed behind the spacer 13*f* in the optical axis direction. While the lens unit 10F includes two lenses, namely, the first lens 11*f* and the second lens 11*g*, the number of lenses is not particularly specified. The lens unit 10F may include three or more pieces of lenses aligned in the optical axis direction, namely, a first lens (a convex lens or a concave lens) to an n-th lens (a convex lens or a concave lens).

The first lens 11*f*, the diaphragm 12, the second lens 11*g*, the spacer 13*f*, and the sensor-dedicated cover member 15 are aligned in series in the optical axis direction and are integrated. As shown in FIG. 14, the first lens 11*f*, the diaphragm 12, the second lens 11*g*, the spacer 13*f*, and the sensor-dedicated cover member 15 are housed in the housing space 17 of the holder 16.

The first lens 11*f* is formed of transparent glass (cover glass) or transparent synthetic resin. The first lens 11*f* includes the front end surface 25, the rear end surface 26, the four side surfaces 27, and the four corners 28. The front end surface 25 is on the object side. The rear end surface 26 is a plane on the image side (the second lens 11*g* side) opposite to the front end surface 25. The four side surfaces 27 extend between the front end surface 25 and the rear end surface 26. The corners 28 are each located where the side surfaces 27 intersect.

The shape of the side surfaces 27 is a square prism (a quadrangular prism). The radial cross-sectional shape of the first lens 11*f* is a square (a quadrangle). The center of the front end surface 25 of the first lens 11*f* is concave frontward in the optical axis direction and the center of the rear end surface 26 of the first lens 11*f* is concave frontward in the optical axis direction. Thus, the first lens 11*f* forms the concave lens 64 whose center is concave frontward in the optical axis direction. The flange part 32 of the first lens 11*f* surrounds the outer periphery of the concave lens 64.

As shown in FIG. 14, the first lens 11*f* is fitted into the front part of the housing space 17 of the holder 16. The four corners 28 abut on the inner circumferential surface 23 of the barrel 22 of the holder 16. The barrel 22 of the holder 16 forms a circumcircle of the square cross-sectional shape of the first lens 11*f*. Note that, at least two of the four corners 28 abutting on the inner circumferential surface 23 of the barrel 22 of the holder 16 will suffice. The shape of the side surfaces 27 may be, in place of a quadrangular prism, any polygonal prism (such as a triangular prism, a pentagonal prism, and a hexagonal prism) or a circular cylinder. The radial cross-sectional shape of the first lens 11*f* may be, in place of a quadrangle, any polygon (such as a triangle, a pentagon, a hexagon) or a circle. The diaphragm 12 is formed between the first lens 11*f* and the second lens 11*g* and at the rear end surface 26 of the first lens 11*f*. The circular hole 24 (the aperture hole) is formed at the center of the diaphragm 12.

The second lens 11*g* is formed of transparent glass or transparent synthetic resin. The second lens 11*g* includes the front end surface 25, the rear end surface 26, the four side surfaces 27, and the four corners 28. The front end surface 25 is on the object side (the first lens 11*f* side). The rear end surface 26 is a surface on the image side (the spacer 13*f* side) opposite to the front end surface 25. The four side surfaces 27 extend between the front end surface 25 and the rear end surface 26. The corners 28 are each located where the side surfaces 27 intersect. The second lens 11*g* is positioned behind the diaphragm 12 (the first lens 11*f*) in the optical axis direction. The radial cross-sectional shape of the second lens 11*g* is a square (a quadrangle). The second lens 11*g* is identical in cross-sectional shape to the first lens 11*f*.

The center of the front end surface 25 of the second lens 11*g* is concave frontward in the optical axis direction. The center of the rear end surface 26 of the second lens 11*g* is concave frontward in the optical axis direction. This forms the circular concave lens part 61 in which the center of each of the front end surface 25 and the rear end surface 26 is concave frontward in the optical axis direction. The concave lens part 61 is a spherical lens, but may be an aspheric lens. The concave part 31 is concave frontward in the optical axis direction from the convex lens part 30 and the flange part 32. The concave part 31 is positioned between the concave lens part 61 and the flange part 32. The concave part 31 extends flatly radially outward from the periphery of the concave lens part 61 and surrounds the periphery of the concave lens part 61.

The flange part 32 of the second lens 11*g* surrounds the outer periphery of the concave part 31. The flange part 32 of the second lens 11*g* includes the inner side surface 33 and the rear end surface 26. The inner side surface 33 extends rearward in the optical axis direction from the outer periphery of the concave part 31 while increasing its width. The rear end surface 26 is a flat surface that extends radially outward from the tip of the inner side surface 33. The rear end surface 26 of the flange part 32 of the second lens 11*g* is spaced apart rearward in the optical axis direction from the center of the concave lens part 61. The rear end surface 26 is positioned just slightly rearward in the optical axis direction from the center of the concave lens part 61.

The front end surface 25 of the flange part 32 of the second lens 11*g* opposes to the rear end surface 26 of the first lens 11*f* of the flange part 32 (the diaphragm 12). The front end surface 25 of the flange part 32 of the second lens 11*g* is bonded by the transparent adhesive 29*a* to the rear end surface 26 of the first lens 11*f* of the flange part 32. The adhesive 29*a* is different in refractive index from the first and second lenses 11*g*, 11*f* by 0.1 or less.

As shown in FIG. 14, the second lens 11*g* is fitted into the middle part of the housing space 17 of the holder 16 to be positioned at the front of the spacer 13*f* in the optical axis direction. The four corners 28 abut on the inner circumferential surface 23 of the barrel 22 of the holder 16. The barrel 22 of the holder 16 forms a circumcircle of the square cross-sectional shape of the second lens 11*g*. Note that, at least two of the four corners 28 abutting on the inner circumferential surface 23 of the barrel 22 of the holder 16 will suffice.

The spacer 13*f* is formed of transparent glass or transparent synthetic resin. The spacer 13*f* includes the front end surface 34, the rear end surface 35, the four side surfaces 36, and the four corners 37. The front end surface 34 is on the object side (the second lens 11g side). The rear end surface 35 includes the concave-convex parts 50 on the image side (the sensor-dedicated cover member 15 side) opposite to the front end surface 34. The four side surfaces 36 extend between the front end surface 34 and the rear end surface 35. The corners 37 are each located where the side surfaces 36 intersect. The shape of the side surfaces 36 is a square prism (a quadrangular prism). The radial cross-sectional shape of the spacer 13f is a square (a quadrangle). The spacer 13f is identical in cross-sectional shape to the first lens 11f, the second lens 11g, and the sensor-dedicated cover member 15.

The spacer 13f is disposed behind the second lens 11g in the optical axis direction and interposed between the second lens 11g and the sensor-dedicated cover member 15. The spacer 13f has its length in the optical axis direction adjusted, and used for focusing the first lens 11f (the concave lens 64) and the second lens 11g (the concave lens part 61). As shown in FIG. 14, the spacer 13f is fitted into the rear part in the housing space 17 of the holder 16 to be positioned at the front of the sensor-dedicated cover member 15 in the optical axis direction. The four corners 37 abut on the inner circumferential surface 23 of the barrel 22 of the holder 16. The barrel 22 of the holder 16 forms a circumcircle of the square cross-sectional shape of the spacer 13f. Note that, at least two of the four corners 37 abutting on the inner circumferential surface 23 of the barrel 22 of the holder 16 will suffice.

The spacer 13f includes the circular spaced-apart part 38 and the bonded peripheral part 39. The spaced-apart part 38 opposes to the concave part 31 and the concave lens part 61 of the second lens 11g. The bonded peripheral part 39 has a predetermined area and opposes to the flange part 32 of the second lens 11g. The front end surface 34 of the spaced-apart part 38 forms the lens 60 that includes the first concave portion 57, the convex portion 58, and the second concave portion 59. The first concave portion 57 is concave rearward in the optical axis direction from the front end surface 34 of the bonded peripheral part 39. The convex portion 58 is convex frontward in the optical axis direction from the inner periphery of the first concave portion 57. The second concave portion 59 is concave in the optical axis direction toward the center of the spaced-apart part 38 from the inner periphery of the convex portion 58. The front end surface 34 of the spaced-apart part 38 (the lens 60 that includes the first concave portion 57, the convex portion 58, and the second concave portion 59) is spaced apart by a predetermined dimension rearward in the optical axis direction from the concave part 31 and the concave lens part 61 of the second lens 11g.

The bonded peripheral part 39 extends radially outward from the outer periphery of the spaced-apart part 38 and surrounds the spaced-apart part 38. The front end surface 34 of the bonded peripheral part 39 extends flatly radially outward from the outer periphery of the spaced-apart part 38. The front end surface 34 of the bonded peripheral part 39 is spaced apart by a predetermined dimension frontward in the optical axis direction from the front end surface 34 of the spaced-apart part 38. The front end surface 34 of the bonded peripheral part 39 is positioned at the front end surface 34 of the spaced-apart part 38 in the optical axis direction.

The front end surface 34 of the bonded peripheral part 39 abuts on the rear end surface 26 of the flange part 32 of the second lens 11g. The front end surface 34 of the bonded peripheral part 39 is bonded by the transparent adhesive 29b to substantially the entire area of the rear end surface 26 of the flange part 32 of the second lens 11g. The space 40 is formed between the concave lens part 61 of the second lens 11g and the front end surface 34 of the spaced-apart part 38 of the spacer 13f.

The front end surface 41 of the sensor-dedicated cover member 15 opposes to the rear end surface 35 of the spacer 13f. The front end surface 41 of the sensor-dedicated cover member 15 is bonded by the transparent adhesive 29c to the rear end surface 35 of the spacer 13f. The adhesive 29c is different in refractive index from the transparent spacer 13f and the transparent sensor-dedicated cover member 15 by 0.1 or less. Note that, a convex part or the concave part 53 may be formed at the rear end surface 35 of the spacer 13f. The plurality of concave-convex parts 50 may not be formed at the rear end surface 35 of the spacer 13f. The rear end surface 35 may be flat.

The adhesive 29c enters the plurality of concave-convex parts 50 formed at the rear end surface 35 of the spacer 13f, and the anchoring effect of the adhesive 29c strongly fixes the front end surface 41 of the sensor-dedicated cover member 15 and the rear end surface 35 of the spacer 13f. Even when a prescribed load acts on the spacer 13f and the sensor-dedicated cover member 15, the rear end surface 35 of the spacer 13f, the front end surface 41 of the sensor-dedicated cover member 15, and the surrounding region are surely prevented from being damaged or broken.

In the housing space 17 of the holder 16 having a circular radial cross-sectional shape, the small lens unit 10F (the first lens 11f, the second lens 11g, the spacer 13f), and the sensor-dedicated cover member 15 each having a square (polygonal) radial cross-sectional shape are housed. Accordingly, between the side surfaces 27, 36, 43 (the outer circumferential surfaces) of the small lens unit 10F and the sensor-dedicated cover member 15 and the inner circumferential surface 23 of the barrel 22 of the holder 16, the gap 48 that extends in the optical axis direction is formed. The adhesive 49 (filler) fills up (is injected into) the gap 48 (the housing space 17). When the gap 48 allows entry of light, unwanted light can slightly enter the light receiving element 45. Here, filling the gap 48 with the light-blocking adhesive 49 will block any light that would otherwise enter the gap 48. This prevents any unwanted light from entering the light receiving element 45. The adhesive 49 fixes the small lens unit 10F and the sensor-dedicated cover member 15 to the housing space 17 of the holder 16. Note that, the gap 48 (the housing space 17) may not be filled with the adhesive 49.

The rear end surface 26 of the flange part 32 of the second lens 11g is spaced apart rearward in the optical axis direction from the center of the concave lens part 61. The rear end surface 26 of the flange part 32 is positioned just slightly rearward in the optical axis direction from the center of the concave lens part 61. The second lens 11g includes the concave part 31 that is positioned between the concave lens part 61 and the flange part 32 and concave frontward in the optical axis direction from the concave lens part 61 and the flange part 32. The front end surface 34 of the spaced-apart part 38 of the spacer 13f forms the lens 60 that includes the first concave portion 57 that is concave rearward in the optical axis direction from the front end surface 34 of the bonded peripheral part 39, the convex portion 58 that is convex frontward in the optical axis direction from the inner periphery of the first concave portion 57, and the second concave portion 59 that is concave rearward in the optical axis direction toward the center of the spaced-apart part 38 from the inner periphery of the convex portion 58. This increases the area of the rear end surface 26 of the flange part 32 and the bonding area of the rear end surface 26 of the flange part 32 of the second lens 11g to the front end surface 34 of the bonded peripheral part 39, without increasing the extending dimension of the flange part 32 of the second lens 11g rearward in the optical axis direction.

The rear end surface 26 of the flange part 32 that is positioned just slightly rearward in the optical axis direction from the concave lens part 61 of the second lens 11g abuts on the front end surface 34 of the bonded peripheral part 39 of the spacer 13f. The adhesive 29b bonds the rear end surface 26 of the flange part 32 of the second lens 11g and the front end surface 34 of the bonded peripheral part 39. Accordingly, the rear end surface 26 of the flange part 32 of the second lens 11g and the front end surface 34 of the bonded peripheral part 39 are stably fixed. The adhesive 29b strongly fixes the rear end surface 26 of the flange part 32 of the second lens 11g and the front end surface 34 of the bonded peripheral part 39. Even when a prescribed load acts on the flange part 32 of the second lens 11g and the bonded peripheral part 39, the rear end surface 26 of the flange part 32 of the second lens 11g, the front end surface 34 of the bonded peripheral part 39, and the surrounding region are prevented from being damaged or broken.

The front end surface 34 of the spaced-apart part 38 of the spacer 13f forms the lens 60 that includes the first concave portion 57 that is concave rearward in the optical axis direction from the front end surface 34 of the bonded peripheral part 39, the convex portion 58 that is convex frontward in the optical axis direction from the inner periphery of the first concave portion 57, and the second concave portion 59 that is concave rearward in the optical axis direction toward the center of the spaced-apart part 38 from the inner periphery of the convex portion 58. This efficiently corrects curvature of field, which is one type of aberration that occurs at the convex lens part 30 disposed at the front of the spacer 13f. This realizes high optical performance with a smaller number of lenses. The lens 60 formed by the front end surface 34 of the spaced-apart part 38 increases the resolution of an image captured using the small lens unit 10F and improves the image quality.

Seventh Embodiment

Figure 15:
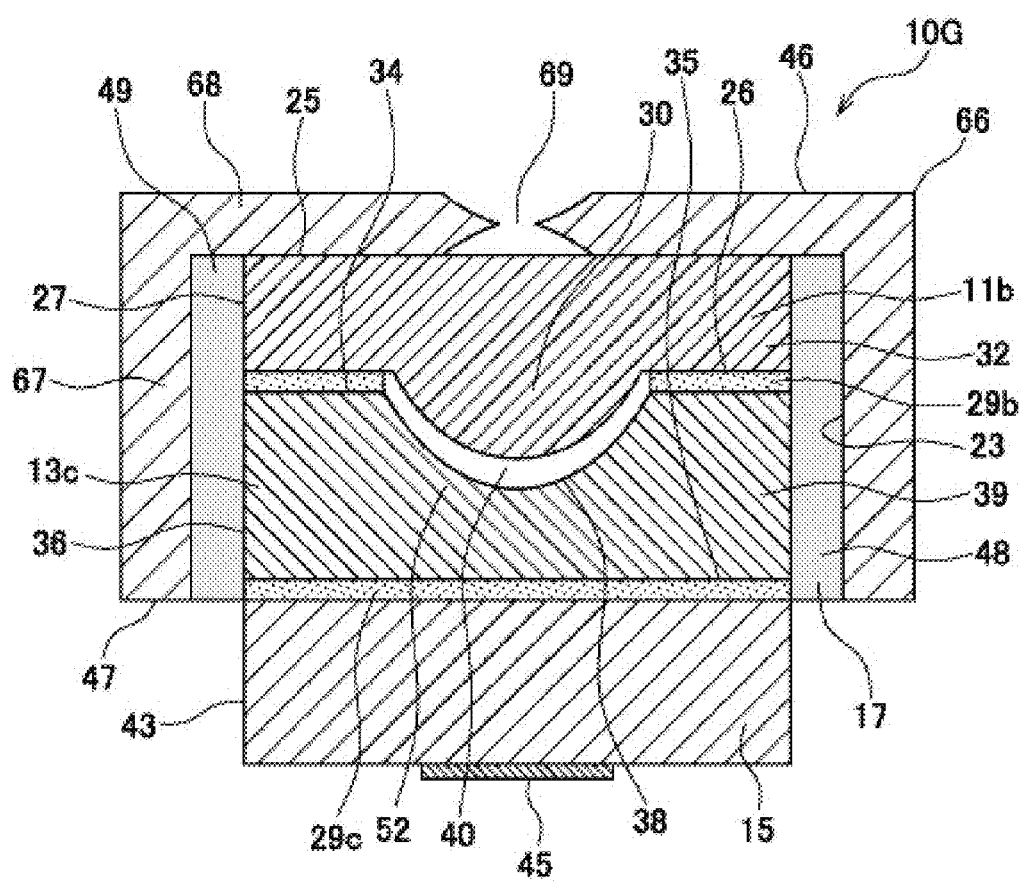
FIG. 15 is a cross-sectional view of a small lens unit according to a seventh embodiment housed in a holder taken along line B-B in FIG. 3.
Figure 16:
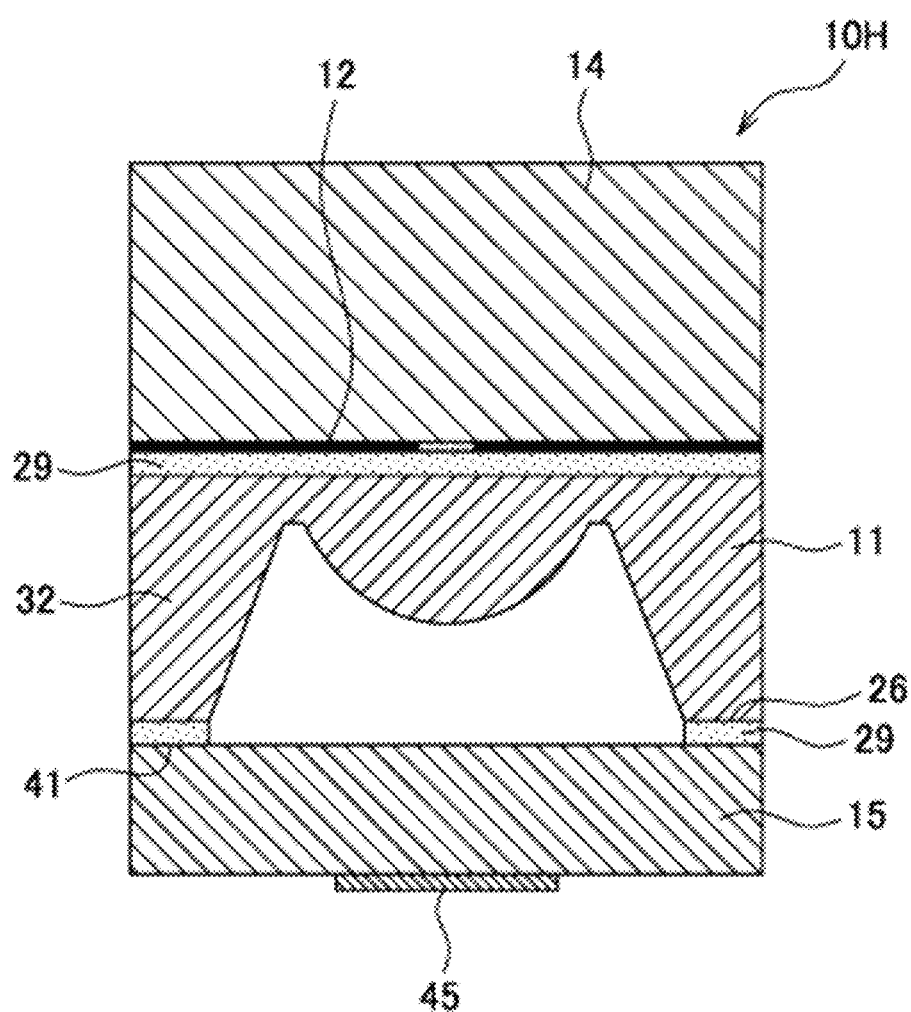
FIG. 16 is a perspective view of a small lens unit of a conventional technique.

FIG. 15 is a cross-sectional view of a small lens unit 10G according to a seventh embodiment housed in a holder 66 taken along line B-B in FIG. 3. The small lens unit 10G according to the present embodiment is different from the first embodiment in that: no cover member 14 is disposed; none of the aperture pattern 12 (the aperture-setting means) and the diaphragm 12 (the aperture-setting means) exist; the lens 11b does not include the annular concave part 31; the front end surface 34 of the spaced-apart part 38 of the spacer 13c forms the concave lens 52 that is concave rearward in the optical axis direction from the front end surface 34 of the bonded peripheral part 39; and a cover part 68 of the holder 66 is positioned at the front end surface 25 of the lens 11b. Other structures of the small lens unit 10G according to the present embodiment are identical to those of the small lens unit 10A according to the first embodiment. Accordingly, those structures are denoted by the same reference signs as the first embodiment, and the detailed description thereof is substituted by the description of the lens unit 10A according to the first embodiment.

The small lens unit 10G according to the present embodiment includes the lens 11b and the spacer 13c. The spacer 13c is disposed behind the lens 11b in the optical axis direction. The sensor-dedicated cover member 15 is disposed behind the spacer 13c in the optical axis direction. The lens 11b, the spacer 13c, and the sensor-dedicated cover member 15 are aligned in series in the optical axis direction and are integrated. As shown in FIG. 15, the lens 11b and the spacer 13c are housed in the housing space 17 of the holder 66. The lens 11b, the spacer 13c, and the sensor-dedicated cover member 15 of the lens unit 10G according to the present embodiment are identical to those of the lens unit 10C according to the third embodiment.

The holder 66 is formed of synthetic resin (plastic). The holder 66 includes a barrel 67, a cover part 68, and the housing space 17. The barrel 67 is cylindrical and extends in the optical axis direction. The cover part 68 extends radially inward from the front end 46 of the barrel 67. The housing space 17 is surrounded by the barrel 67 and the cover part 68. The barrel 67 includes the front end 46 and the rear end 47. The diameter L4 of the barrel 67 (the outer diameter of the holder (see FIG. 3)) is, for example, 1.4 mm. Note that, the holder 66 may be formed of metal such as SUS or alloy. The radial cross-sectional shape of the housing space 17 is a circle (a perfect circle). The housing space 17 is cylindrical and extends from the front end 46 (front) to the rear end 47 (rear) of the barrel 67. The maximum inner diameter of the housing space 17 is adjusted within a range of 0.4 mm to 2 mm.

The lens 11b and the spacer 13c are fitted into the housing space 17. The four corners 28 of the square prism of the lens 11b and the four corners 37 of the square prism of the spacer 13c abut on the inner circumferential surface 23 of the barrel 67. The barrel 67 forms a circumcircle of the square cross-sectional shape of the lens 11b and the spacer 13c. Note that, at least two of the four corners 28, 37 of the square prism of the lens 11b and the spacer 13c abutting on the inner circumferential surface 23 of the barrel 67 of the holder 66 will suffice. The cover part 68 is positioned at the front end surface 25 of the lens 11b and covers the front end surface 25. A circular hole 69 is formed at the center of the cover part 68. At the hole 69, the front end surface 25 of the lens 11b is exposed.

The radial cross-sectional shape (a circle) of the barrel 67 is different from the radial cross-sectional shape (a square) of the small lens unit 10G (the lens 11b, the spacer 13c). Accordingly, when the small lens unit 10G whose cross-sectional shape (a square) is different from the cross-sectional shape (a circle) of the housing space 17 is housed in the housing space 17, the gap 48 that extends in the optical axis direction is formed between the inner circumferential surface 23 of the barrel 67 and the side surfaces 27, 36 (the outer circumferential surfaces) of the lens unit 10G.

The adhesive 49 (filler) fills up (is injected into) the gap 48 (the housing space 17) between the side surfaces 27, 36 of the small lens unit 10G and the inner circumferential surface 23 of the barrel 67. The adhesive 49 is cured in the gap. The adhesive 49 fixes the small lens unit 10G to the housing space 17. Note that, the gap 48 may not be filled with the adhesive 49.

The rear end surface 26 of the flange part 32 of the lens 11b is spaced apart frontward in the optical axis direction from the center of the convex lens part 30. The rear end surface 26 of the flange part 32 is positioned slightly frontward in the optical axis direction from the center of the convex lens part 30. The front end surface 34 of the bonded peripheral part 39 of the spacer 13c is positioned at the front of the front end surface 34 of the spaced-apart part 38 in the optical axis direction. The front end surface 34 of the spaced-apart part 38 of the spacer 13c forms the concave lens 52 that is concave rearward in the optical axis direction from the front end surface 34 of the bonded peripheral part 39. This increases the area of the rear end surface 26 of the flange part 32 and the bonding area of the rear end surface 35 of the flange part 32 to the front end surface 34 of the bonded peripheral part 39, without increasing the extending dimension of the flange part 32 rearward in the optical axis direction.

The rear end surface 26 of the flange part 32 of the lens 11b that is positioned just slightly frontward in the optical axis direction from the convex lens part 30 abuts on the front end surface 34 of the bonded peripheral part 39 of the spacer 13c. The adhesive 29b bonds the rear end surface 26 of the flange part 32 and the front end surface 34 of the bonded peripheral part 39. Accordingly, the rear end surface 26 of the flange part 32 of the lens 11b and the front end surface 34 of the bonded peripheral part 39 are stably fixed. The adhesive 29b strongly fixes the rear end surface 26 of the flange part 32 and the front end surface 34 of the bonded peripheral part 39. Even when a load acts on the spacer 13c and the flange part 32 of the lens 11b, the front end surface 34 of the bonded peripheral part 39, the rear end surface 26 of the flange part 32, and the surrounding region are prevented from being damaged or broken.

The front end surface 34 of the spaced-apart part 38 of the spacer 13c forms the concave lens 52 that is concave rearward in the optical axis direction toward the center of the spaced-apart part 38 from the front end surface 34 of the bonded peripheral part 39. This efficiently corrects curvature of field, which is one type of aberration that occurs at the convex lens part 30 disposed at the front of the spacer 13c. This realizes high optical performance with a smaller number of lenses. The concave lens 52 formed at the front end surface 34 of the spaced-apart part 38 increases the resolution of an image captured using the small lens unit 10G and improves the image quality. The cover part 68 covers the front end surface 25 of the lens 11b; the circular hole 69 is formed at the center of the cover part 68; and the cover part 68 forms the aperture-setting means. Thus, the aperture pattern 12 can be dispensed with.

In the small lens units 10A to 10G according to the first to seventh embodiments, the radial length of the rear end surface 26 of the flange part 32 of each of the lenses 11a to 11g bonded to the front end surface 34 of the bonded peripheral part 39 of corresponding one of the spacers 13a to 13f falls within a range of 0.15 to 0.4 mm. Accordingly, in the small lens units 10A to 10G, the rear end surface 26 of the flange part 32 and the front end surface 34 of the bonded peripheral part 39 of the spacers 13a to 13f are bonded to each other by a radial length of 0.15 to 0.4 mm.

When the radial length of the rear end surface 26 of the flange part 32 of each of the lenses 11a to 11g is less than 0.15 mm, the area of the rear end surface 26 of the flange part 32 is not great enough and the rear end surface 26 of the flange part 32 and the front end surface 34 of the bonded peripheral part 39 of corresponding one of the spacers 13a to 13f are not stably fixed. Additionally, the adhesive 29 cannot strongly fix the rear end surface 26 of the flange part 32 and the front end surface 34 of the bonded peripheral part 39. When the radial length of the rear end surface 26 of the flange part 32 of each of the lenses 11a to 11g exceeds 0.4 mm, the lens units 10A to 10G cannot attain the required small size.

In the small lens units 10A to 10G, the radial length of the rear end surface 26 of the flange part 32 fixed to the front end surface 34 of the bonded peripheral part 39 of corresponding one of the spacers 13a to 13f falls within a range of 0.15 to 0.4 mm. Accordingly, despite the lens units 10A to 10G being small in size, the rear end surface 26 of the flange part 32 obtains a greater area, which makes it possible to stably fix the rear end surface 26 of the flange part 32 and the front end surface 34 of the bonded peripheral part 39 of corresponding one of the spacers 13a to 13f. Additionally, the adhesive 29b strongly fixes the rear end surface 26 of the flange part 32 and the front end surface 34 of the bonded peripheral part 39. Thus, even when a prescribed load acts on the flange part 32 of each of the lenses 11a to 11g and the bonded peripheral part 39 of each of the spacers 13a to 13f, the rear end surface 26 of the flange part 32, the front end surface 34 of the bonded peripheral part 39, and the surrounding region are prevented from being damaged or broken.

By cutting the integrated cover member 14, aperture pattern 12, lenses 11a to 11g, spacers 13a to 13f, and sensor-dedicated cover member 15, the small lens units 10A to 10G each including the cover member 14 and the sensor-dedicated cover member 15 and having a shape of square (a polygon) are easily obtained. This improves workability without the necessity of employing any complicated structures. The lens units 10A to 10G are mechanically efficiently mass-produced, and the polygonal lens units 10A to 10G with no deviation in accuracy are manufactured at low costs.

In the small lens units 10A to 10G, at least two corners of the cover member 14 having a square (polygonal) cross-sectional shape, at least two corners of the small lens units 10A to 10G having a square (polygonal) cross-sectional shape, and at least two corners of the sensor-dedicated cover member 15 having a square (polygonal) cross-sectional shape abut on the inner circumferential surface 23 of the housing space 17 of the holder 16. This suppresses any displacement of the cover member 14, the small lens units 10A to 10G, and the sensor-dedicated cover member 15 in the housing space 17, and fixes the cover member 14, the small lens units 10A to 10G, and the sensor-dedicated cover member 15 to the housing space 17.

Note that, the lens unit 10A according to the first embodiment, the lens unit 10B according to the second embodiment, the lens unit 10C according to the third embodiment, the lens unit 10D according to the fourth embodiment, the lens unit 10G according to the seventh embodiment may include two or more lenses.

REFERENCE SIGNS LIST 10A to 10G small lens unit
11a to 11g lens
12 aperture pattern (aperture-setting means)
13a to 13f spacer
14 cover member
15 sensor-dedicated cover member
16 holder
17 housing space
18 front end surface
19 rear end surface
20 side surface
21 corner
22 barrel
23 inner circumferential surface
24 hole
25 front end surface
26 rear end surface
27 side surface
28 corner
29 adhesive (filler)
30 convex lens part
31 concave part
32 flange part 33 inner side surface
34 front end surface
35 rear end surface
36 side surface
37 corner
38 spaced-apart part
39 bonded peripheral part
40 space (gap)
41 front end surface
42 rear end surface
43 side surface
44 corner
45 light receiving element
46 front end
47 rear end
48 gap
49 adhesive
50 concave-convex part
51 inner side surface
52 concave lens
53 concave part
54 concave portion
55 convex portion
56 lens
57 first concave portion
58 convex portion
59 second concave portion
60 lens
61 concave lens part
62 convex lens part
64 concave lens
65 concave lens part
66 holder
67 barrel
68 cover part
69 hole
70 light blocking plate
L1 diameter
L2 maximum radial diameter (the length of a diagonal)
L3 thickness dimension
L4 diameter (the outer diameter of the holder)

The invention claimed is:

1. A lens unit comprising:
a lens including
  a lens part that is formed at a center of the lens, and
  a flange part that extends radially outward from a periphery of the lens part, the flange part including a rear end surface on its rear side;
a transparent spacer that is disposed behind the lens in an optical axis direction and used for focusing the lens part, the spacer including
  a front end surface that opposes to a rear of the lens,
  a spaced-apart part that opposes to the lens part and is spaced apart rearward in the optical axis direction from the lens part, and
  a bonded peripheral part that extends radially outward from a periphery of the spaced-apart part;
an adhesive that is disposed between the rear end surface of the flange part and the bonded peripheral part and bonds the lens and the spacer;
a transparent sensor-dedicated cover member that is disposed behind the spacer in the optical axis direction; and
a third adhesive that bonds the spacer and the sensor-dedicated cover member;
a holder that includes housing space for housing the lens and the spacer, the housing space having a circular radial cross-sectional shape; and
a filler that fills up between the lens and the spacer housed in the housing space and the inner circumferential surface of the holder;
wherein the third adhesive is different in refractive index from the spacer and the sensor-dedicated cover member by 0.1 or less, and
a maximum inner diameter of the housing space is 0.4 mm to 2 mm.

2. The lens unit according to claim 1, wherein
the rear end surface of the flange part is positioned rearward in the optical axis direction from a center of the lens part,
the front end surface of the bonded peripheral part extends radially outward from the periphery of the spaced-apart part, the front end surface of the bonded peripheral part being flush with the front end surface of the spaced-apart part,
space is formed between the lens part and the spaced-apart part, and
the rear end surface of the flange part and the front end surface of the bonded peripheral part are bonded by the adhesive while abutting on each other.

3. The lens unit according to claim 1, wherein
the rear end surface of the flange part is positioned frontward in the optical axis direction from a center of the lens part,
the front end surface of the bonded peripheral part is positioned frontward in the optical axis direction from the front end surface of the spaced-apart part,
the spaced-apart part is concave rearward in the optical axis direction from the bonded peripheral part,
space is formed between the lens part and the front end surface of the spaced-apart part, and
the rear end surface of the flange part and the front end surface of the bonded peripheral part are bonded by the adhesive while abutting on each other.

4. The lens unit according to claim 1, wherein the lens includes a concave part that is positioned between the lens part and the flange part and extends radially outward from the periphery of the lens part, the concave part being concave frontward in the optical axis direction from the lens part and the flange part.

5. The lens unit according to claim 1, wherein the lens part is one of a convex lens part that is convex rearward in the optical axis direction and a concave lens part that is concave frontward in the optical axis direction.

6. The lens unit according to claim 1, wherein the front end surface of the spaced-apart part forms a concave lens that is concave rearward in the optical axis direction toward a center of the spaced-apart part from the front end surface of the bonded peripheral part.

7. The lens unit according to claim 1, wherein the front end surface of the spaced-apart part forms a lens that includes a concave portion that is concave rearward in the optical axis direction from the front end surface of the bonded peripheral part and a convex portion that is convex frontward in the optical axis direction toward a center of the spaced-apart part from an inner periphery of the concave portion.

8. The lens unit according to claim 1, wherein the front end surface of the spaced-apart part forms a lens that includes a first concave portion that is concave rearward in the optical axis direction from the front end surface of the bonded peripheral part, a convex portion that is convex frontward in the optical axis direction from an inner periphery of the first concave portion, and a second concave portion that is concave rearward in the optical axis direction toward a center of the spaced-apart part from an inner periphery of the convex portion.

9. The lens unit according to claim 1, wherein a radial length of the rear end surface of the flange part bonded to the bonded peripheral part is 0.15 to 0.4 mm.

10. The lens unit according to claim 1, further comprising:
a transparent cover member that is disposed at a front of the lens in the optical axis direction; and
a second adhesive that bonds the lens and the cover member.

11. The lens unit according to claim 10, wherein the second adhesive is different in refractive index from the lens and the cover member by 0.1 or less.

12. The lens unit according to claim 1, wherein the spacer includes, at its rear end surface, a concave part, a convex part, or a concave-convex part.

13. The lens unit according to claim 1,
wherein
the lens and the spacer each have a polygonal radial cross-sectional shape, and
at least two corners of the lens and the spacer abut on an inner circumferential surface of the holder.

14. The lens unit according to claim 1, wherein the lens and the spacer are set in a sensor module of a medical endoscope or a sensor module of an industrial endoscope.

15. The lens unit according to claim 2, wherein the lens includes a concave part that is positioned between the lens part and the flange part and extends radially outward from the periphery of the lens part, the concave part being concave frontward in the optical axis direction from the lens part and the flange part.

16. The lens unit according to claim 3, wherein the lens includes a concave part that is positioned between the lens part and the flange part and extends radially outward from the periphery of the lens part, the concave part being concave frontward in the optical axis direction from the lens part and the flange part.

17. The lens unit according to claim 1, wherein
the filler blocks light from entering the inner circumferential surface of the holder.

* * * * *